United States Patent
Firdaus et al.

(10) Patent No.: US 6,782,582 B2
(45) Date of Patent: Aug. 31, 2004

(54) VACUUM UNIT WITH HOSE ATTACHMENT MEMBER

(75) Inventors: Usman Firdaus, Strongsville, OH (US); John Dawson, Graftom, OH (US); Philip B. Smith, Berea, OH (US); Jeffery R. Kucera, Parma Hts., OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

(21) Appl. No.: 10/367,212

(22) Filed: Feb. 14, 2003

(65) Prior Publication Data

US 2003/0126697 A1 Jul. 10, 2003

Related U.S. Application Data

(62) Division of application No. 09/792,143, filed on Feb. 22, 2001, now Pat. No. 6,519,805.
(60) Provisional application No. 60/184,861, filed on Feb. 25, 2000, and provisional application No. 60/209,031, filed on Jun. 2, 2000.

(51) Int. Cl.$^7$ ............................................. A47L 5/36
(52) U.S. Cl. ........................... 15/323; 15/328; 15/334; 15/338; 15/410
(58) Field of Search ......................... 15/328, 323, 334, 15/410, 336, 335, 338

(56) References Cited

U.S. PATENT DOCUMENTS

| | | | |
|---|---|---|---|
| 1,129,174 A | 2/1915 | Dennis | |
| 1,668,036 A | 5/1928 | Aalborg | |
| 2,046,684 A | 7/1936 | Hoover | |
| 2,871,504 A | * | 2/1959 | Gail et al. ............... 15/338 |
| 3,286,376 A | * | 11/1966 | Wildes ............... 15/338 |
| 3,618,157 A | 11/1971 | Bassin | |
| 3,676,893 A | * | 7/1972 | Smythe ............... 15/328 |
| 3,750,222 A | 8/1973 | Johnson | |
| 3,905,181 A | 9/1975 | Messner | |
| 3,940,827 A | 3/1976 | Greco | |
| 4,951,346 A | 8/1990 | Salmon | |
| 5,247,720 A | 9/1993 | Sovis et al. | |
| 5,351,361 A | 10/1994 | Buchtel | |
| 5,435,118 A | 7/1995 | Cobile | |
| 5,537,807 A | 7/1996 | Gearing et al. | |
| 5,540,038 A | 7/1996 | Bold et al. | |
| 5,560,074 A | 10/1996 | Graham et al. | |
| 5,642,864 A | 7/1997 | Middlesworth et al. | |
| 6,039,817 A | 3/2000 | Payne | |
| 6,170,118 B1 | * | 1/2001 | McIntyre et al. ............... 15/323 |

FOREIGN PATENT DOCUMENTS

GB 2 261 616 A 5/1993

* cited by examiner

*Primary Examiner*—Theresa T. Snider
(74) *Attorney, Agent, or Firm*—Wegman Hessler & Vanderburg

(57) ABSTRACT

A vacuum unit used to vacuum lawn debris includes a vacuum unit body having at least first and second inlet openings and at least one flap that can be adjusted to selectively cover and open the second opening. The vacuum unit body includes a flap adjustment member that is located within the second opening and that includes a contact surface that contacts the flap. Preferably, the flap adjustment member has one end that is adapted to receive a vacuum hose. The flap adjustment member can be placed into a first position where it causes the flap to open the second opening and a second position where it permits the flap to cover the second opening. The vacuum hose has a handle that can be attached to the vacuum unit handle permitting the vacuum hose to remain permanently attached to the vacuum unit even when the vacuum hose is not being used.

16 Claims, 22 Drawing Sheets

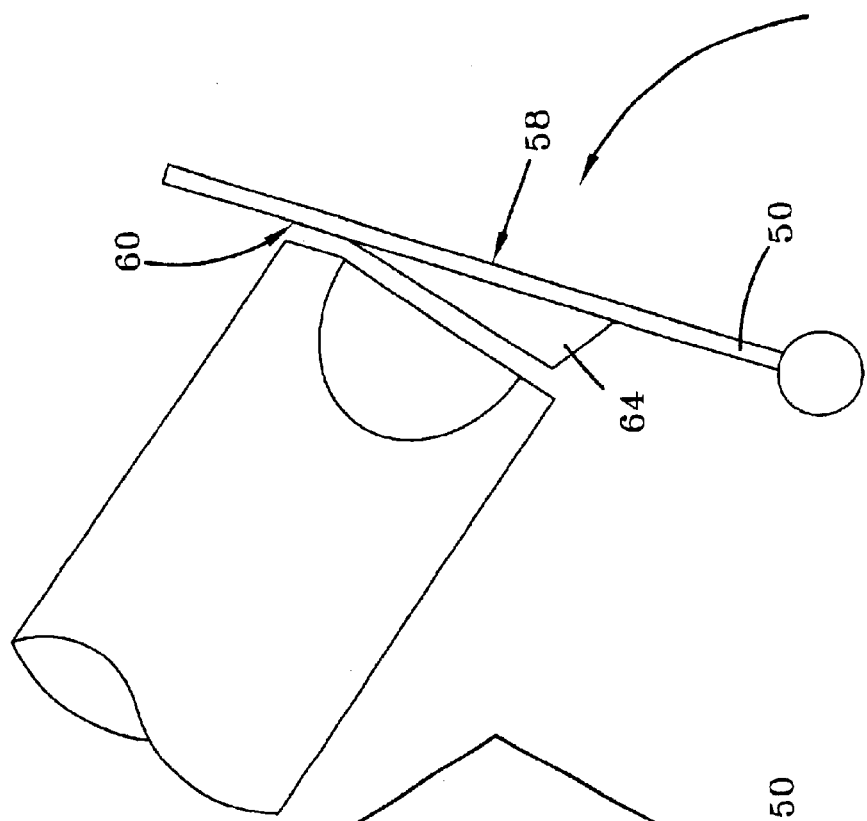
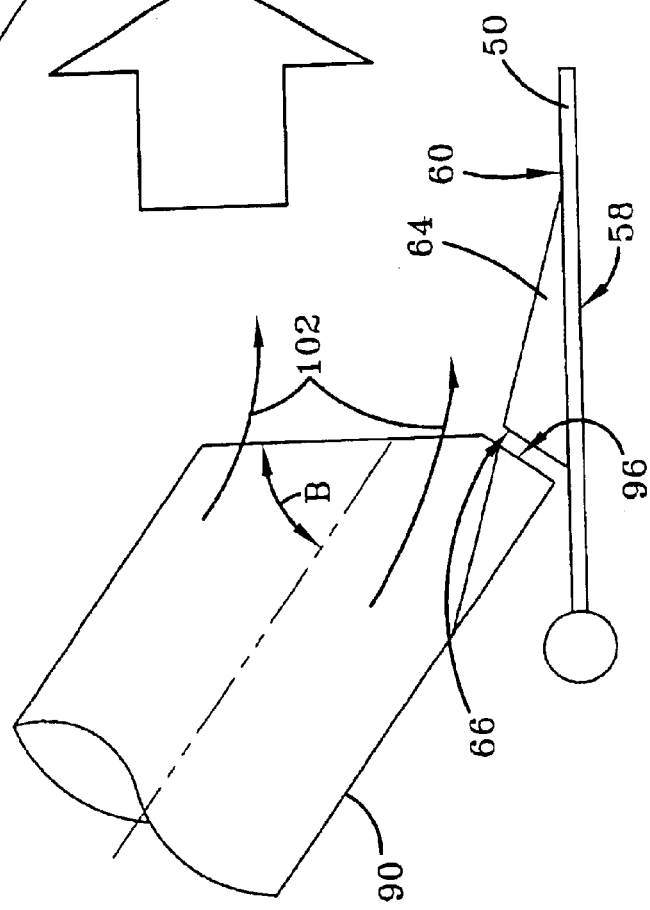
FIG-8B
FIG-8A

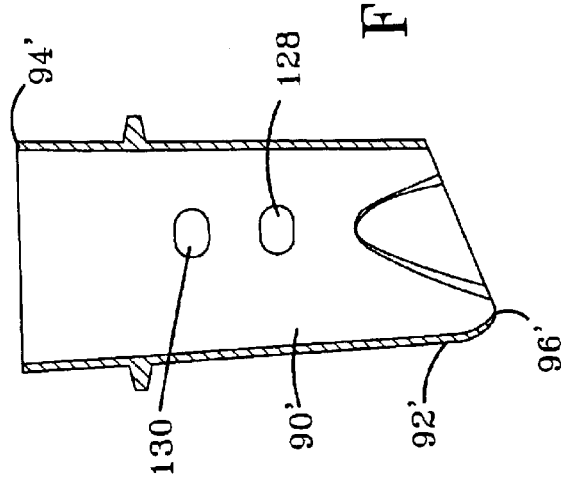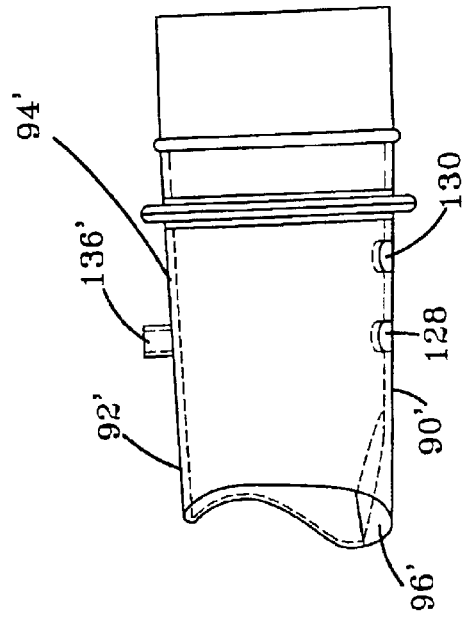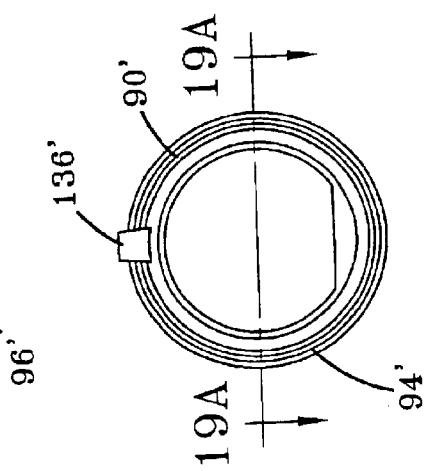

VACUUM UNIT WITH HOSE ATTACHMENT MEMBER

"This application is a U.S. Divisional Patent Application that claims the benefit of U.S. Utility patent application Ser. No. 09/792,143, filed Feb. 22, 2001, now U.S. Pat. No. 6,519,805 by the same inventor Usman Firdaus, entitled ADJUSTABLE VACUUM NOZZLE," incorporated herein by reference, which claims priority from Provisional Patent Application Serial No. 60/184,861 filed Feb. 25, 2000, and from Provisional Patent Application Serial No. 60/209,031 filed Jun. 2, 2000.

BACKGROUND OF THE INVENTION

1. Field of Invention

This invention pertains to the art of methods and apparatuses for yard vacuum units, and more specifically to methods and apparatuses for an adjustable vacuum nozzle used on a yard vacuum unit.

2. Description of the Related Art

It is known to provide vacuum units for use in vacuuming yard debris such as leaves, small sticks, grass clippings and the like. However, there are problems related to known vacuum units that can alternatively be configured to operate with a nozzle or with a separate hose attachment. These problems include the cumbersome methods used to make the configuration adjustment. U.S. Pat. No. 5,642,864 to Middlesworth et al., for example, requires that a cap be placed over the hose inlet when the hose is not in use. This cap must then be removed and the hose must be re-attached each time the hose is to be used. What is needed is a method to easily adjust a vacuum nozzle between the hose and nozzle configurations.

Another problem is the placement and/or storage of the hose when the vacuum unit is configured to operate with a nozzle. Typically, the hose must be removed from the vacuum unit and stored at some remote location. What is needed is a method to maintain the hose with the vacuum unit even when the hose is not being used.

The present invention provides methods and apparatuses for simplifying the adjustment between nozzle and hose configurations and for providing an easy and convenient location for storing the hose when the unit is in the nozzle configuration. The difficulties inherit in the art are therefore overcome in a way that is simple and efficient, while providing better and more advantageous results.

SUMMARY OF THE INVENTION

According to one aspect of the present invention, a vacuum unit includes a vacuum unit body, a plurality of ground engaging wheels that are operatively connected to the vacuum unit body and an engine that is supported by the vacuum unit body. The vacuum unit also includes one or more fan blades positioned within the vacuum unit body and selectively rotated by the engine. These fan blades are for use in creating a vacuum pressure within the vacuum unit body. The vacuum unit body includes a vacuum deck and a nozzle that is operatively connected to the vacuum deck. The nozzle receives and transports debris to the vacuum unit body. The nozzle has a nozzle body with first, second and third openings and a connecting means for use in connecting the third opening to the vacuum deck. The nozzle also has a flap that is pivotally connected to the nozzle body and is used to selectively open and cover the second opening of the nozzle body. The nozzle also has a flap adjustment member that is positioned within the second opening. The flap adjustment member is positioned within the second opening and is selectively adjustable with respect to the nozzle body into first and second positions. The flap adjustment member has a contact surface that contacts the flap. The flap opens the second opening when the flap adjustment member is in the first position and covers the second opening when the flap adjustment member is in the second position.

According to another aspect of the present invention, the flap may also be used to selectively open and cover the first opening of the nozzle body. The flap covers the first opening when the flap adjustment member is in the first position and opens the first opening when the flap adjustment member is in the second position.

Accordingly to another aspect of the present invention, the second opening may be positioned on the vacuum deck, instead of the nozzle body. Preferably the vacuum deck has a vacuum deck body that includes the second opening. In this configuration, the vacuum deck has a first flap for use in selectively opening and covering the second opening and the nozzle has a second flap for use in selectively opening and covering the first opening, which remains positioned on the nozzle body. The first flap is pivotally connected to the vacuum deck body. The vacuum deck also includes a flap adjustment member. The flap adjustment member is positioned within the second opening and is selectively adjustable with respect to the vacuum deck body into first and second positions. The first flap opens the second opening when the flap adjustment member is in the first position and covers the second opening when the flap adjustment member is in the second position. The nozzle includes the second flap, which is pivotally connected to the nozzle body, and a flap adjustment means. The flap adjustment means is operatively connected to the nozzle body and is selectively adjustable into first and second positions. The second flap opens the first opening when the flap adjustment means is in the second position and closes the first opening when the flap adjustment means is in the first position According to another aspect of the present invention, the vacuum unit may also have a vacuum unit handle that extends from the vacuum unit body and a hose for use in vacuuming debris. The flap adjustment member has a first end that includes the contact surface and a second end that is adapted to receive the vacuum hose. The hose has a hose handle that may be attached to the vacuum unit handle thereby maintaining the hose above the ground during use of the vacuum unit.

One advantage of the present invention is that the nozzle of a vacuum unit may be easily adjusted such that either one of two inlet openings maybe used for vacuuming purposes.

Another advantage of the present invention is that the vacuum hose may be maintained on the vacuum unit at all times even when the vacuum hose is not being used.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 8a is a side view schematic representation of the flap adjustment member in FIG. 7a showing how the contact surface holds the flap against the first opening.

FIG. 8b is a side view schematic representation of the flap adjustment member in FIG. 7b showing the flap against the second opening.

FIG. 19a is a sectional view taken along A—A of FIG. 19b showing the first and second apertures within the flap adjustment member.

FIG. 19b is a top view of the flap adjustment member shown in FIG. 19c.

FIG. 19c is a side view of the flap adjustment member showing the nub extending from the outer surface.

DESCRIPTION OF THE PREFERRED EMBODIMENT

Figure 1:
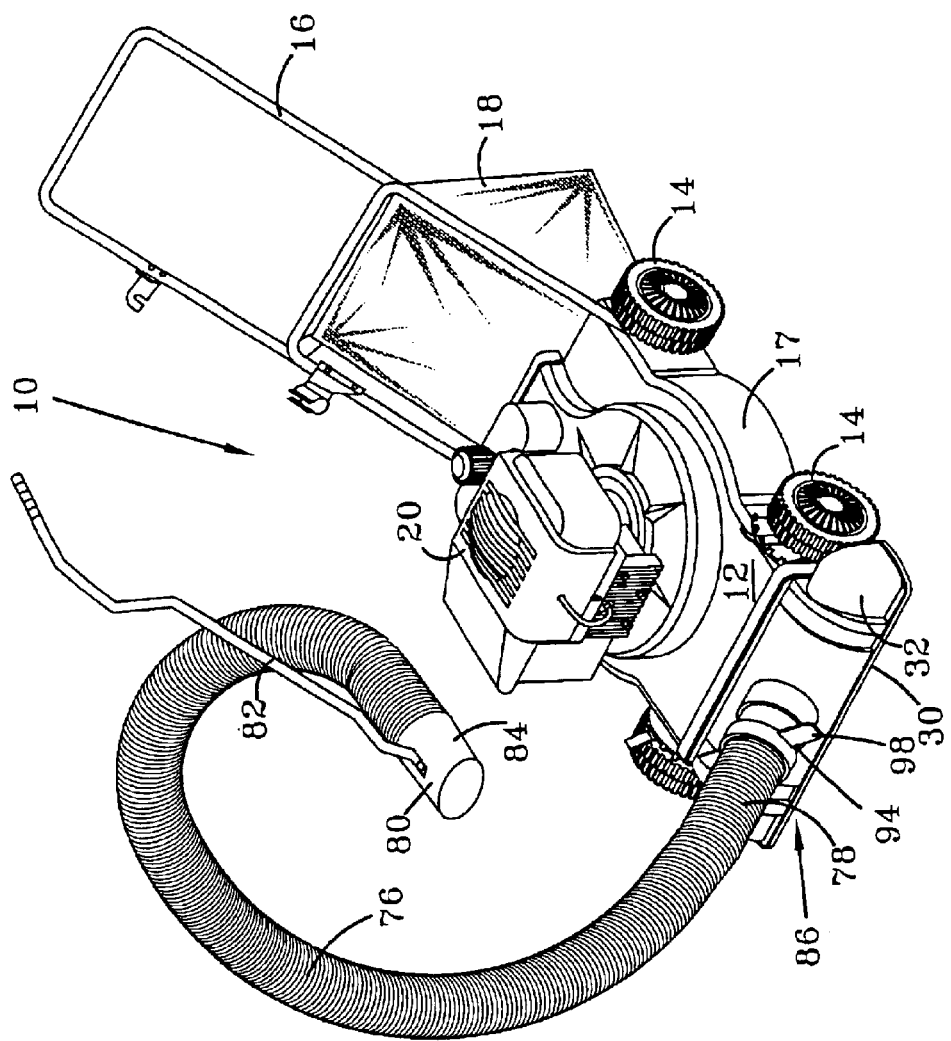
FIG. 1 is a perspective front view of a vacuum unit including the nozzle of the first embodiment of this invention.
Figure 2:
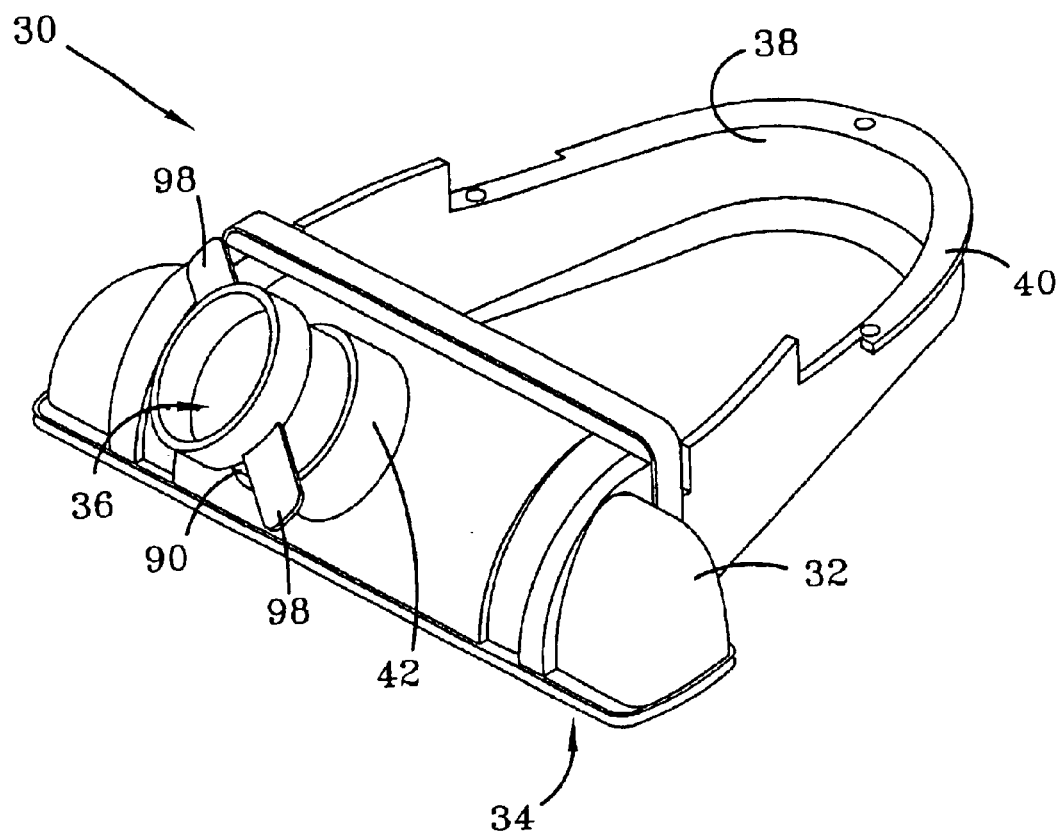
FIG. 2 is a perspective view of the nozzle of the first embodiment of this invention showing the flap adjustment member positioned within this second opening.

Referring now to the drawings wherein the showings are for purposes of illustrating preferred embodiments of the invention only and not for purposes of limiting the same, FIGS. 1–10 show a first embodiment of the invention wherein the second opening is positioned on the nozzle 30 and FIGS. 15–20 show a second preferred embodiment of the invention wherein the second opening is positioned on the vacuum deck 17. Both the first and second embodiments of the invention are described with reference to a walk-behind yard vacuum unit 10 but the invention is also applicable to other vacuum units and other applications as well.

With reference to FIG. 1, a vacuum unit 10 equipped with the first embodiment of the present invention is shown. The vacuum unit 10 includes a body 12 supporting a plurality of ground engaging wheels 14 whereby the vacuum unit 10 can be easily transported. Preferably, a vacuum unit handle 16 extends from the body 12 whereby an operator can provide the required force to move the vacuum unit 10 to the location desired. A collection bag 18 may be supported from the handle 16 and is used to collect debris vacuumed by the vacuum unit 10. An engine 20 is mounted to the body 12 and is used to rotate a fan blade or blades (not shown) within the body 12. When the fan blade is rotated, a sufficient suction or vacuum pressure is created to enable the vacuum unit 10 to transport debris from the nozzle 30 to the bag 18. The operation of the fan blades to create the vacuum pressure is well known in the art and therefore will not be discussed further.

With reference now to FIGS. 1–6, the vacuum unit body 12 also includes a vacuum deck 17 and a nozzle 30 (shown best in FIG. 2) that is operatively connected to the vacuum deck 17. The nozzle 30 includes a nozzle body 32 that has first, second and third openings 34, 36, 38. The first and second openings 34, 36 are used to draw debris (not shown but may include leaves, sticks, grass clippings and the like) into the nozzle 30. The nozzle body 32 forms a chute whereby the debris is transported from the first and second openings 34, 36 to the third opening 38 that is connected to the vacuum deck 17. The particular connecting means 40 used to connect the third opening 38 to the vacuum deck 17 can be of any type chosen with sound engineering judgment such as screws (not shown). Although both inlet openings 34, 36 may be used simultaneously while operating the vacuum unit 10, in most applications the openings 34, 36 will be used one-at a time the particular opening to be used depending on the vacuum requirement. The first opening 34 faces generally downward and is especially useful in vacuuming debris on the ground that is easily accessible to the vacuum unit 10. Preferably the nozzle body 32 has an adjustment extension 42 that forms the second opening 36. Although the adjustment extension 42 may be shaped as desired, in the preferred embodiment it is generally cylindrical as shown. The second opening 36 faces generally upward and is useful in attaching an implement, such as a hose 76. The second opening 36 is thus especially useful in vacuuming debris that is not accessible to the first opening 34 of the vacuum unit 10.

With reference now to FIGS. 3–6 and 8a–9, a flap 50 is used to cover (close) the first opening 34 when the second opening 36 is open and thus is being used to vacuum debris. The flap 50 is also used to cover (close) the second opening 36 when the first opening 34 is open and thus being used to vacuum debris. The flap 50 is pivotally attached to the nozzle body 32 using a plurality of pivot rod receivers 52 that receive a pivot rod 54 (shown in part in FIG. 3) that is attached to the nozzle body 32 by any means chosen with sound engineering judgement. Biasing means may be used to bias the flap 50 to cover the second opening 36 and open the first opening 34. In the preferred embodiment, the biasing means is at least one torsion spring 56 (shown in FIG. 9) that receives the pivot rod 54. The operation of the spring 56 is well known in the art and, thus will not be described further. The flap 50 has a first side 58 that is used to cover the first opening 34 and a second side 60 that is used to cover the second opening 36. Preferably both sides 58, 60 are generally planar. The second side 60, however, preferably includes a pair of sealing portions 62 (shown in FIG. 9) that contact an inner surface of the nozzle body 32 on either side of the second opening 36 thereby sealing the second opening 36 when the flap 50 is in the position to cover it. The second side 60 also has a contact zone 64 that will be discussed further below.

Figure 3:
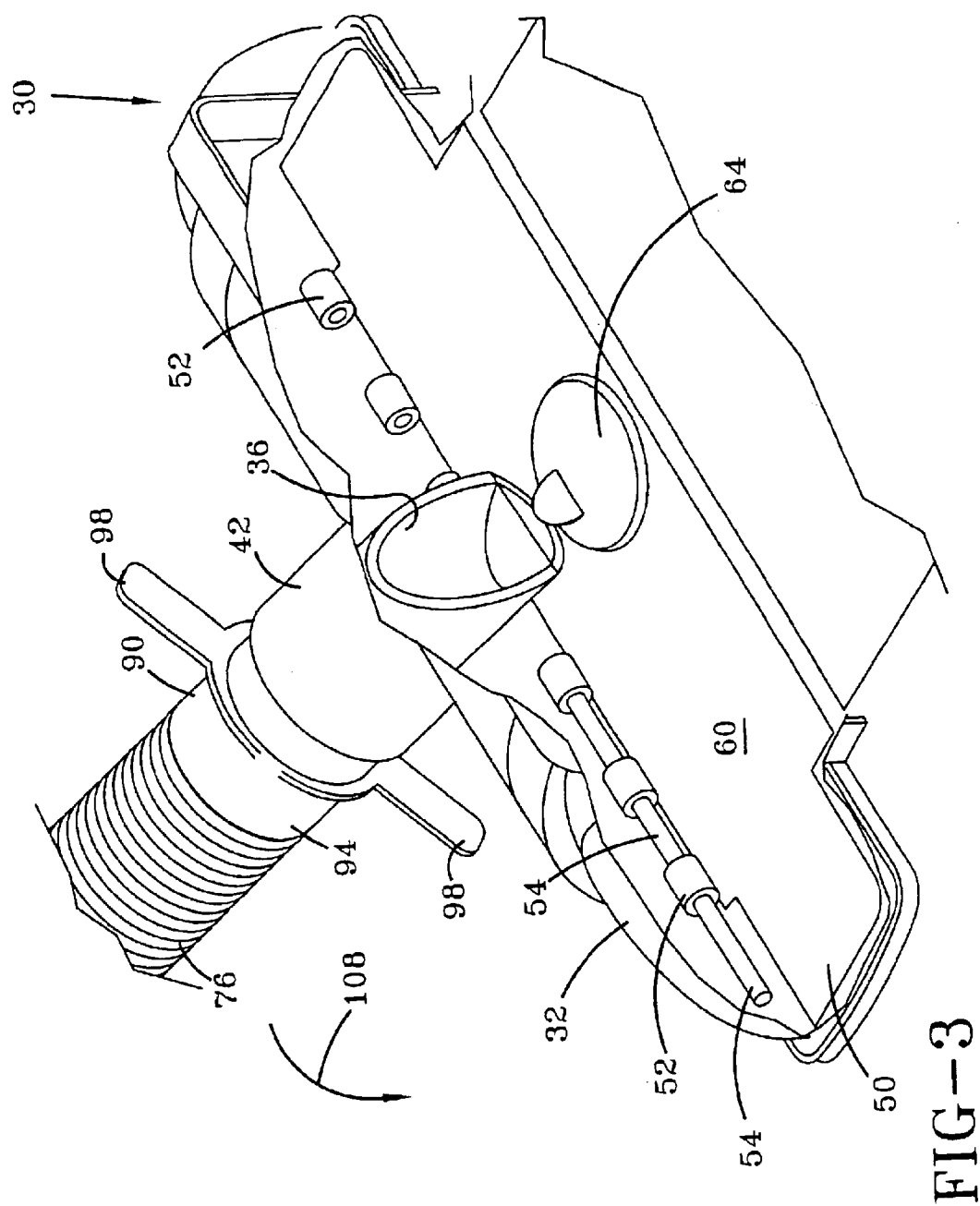
FIG. 3 is a perspective view of the nozzle shown partially in phantom illustrating the flap adjustment member in the first position thereby causing the flap to cover the first opening and open the second opening.
Figure 4:
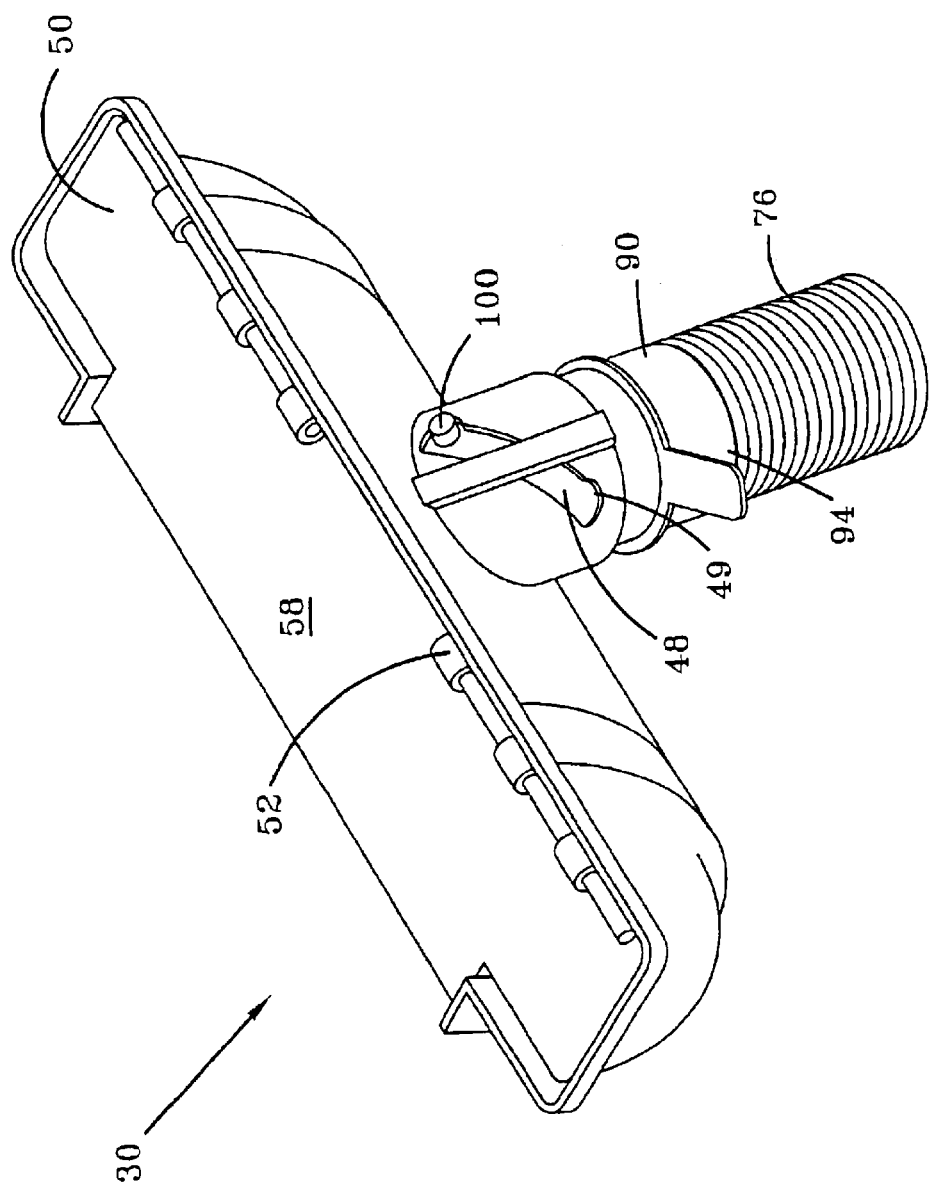
FIG. 4 is a bottom view of the nozzle shown in FIG. 3.
Figure 5:
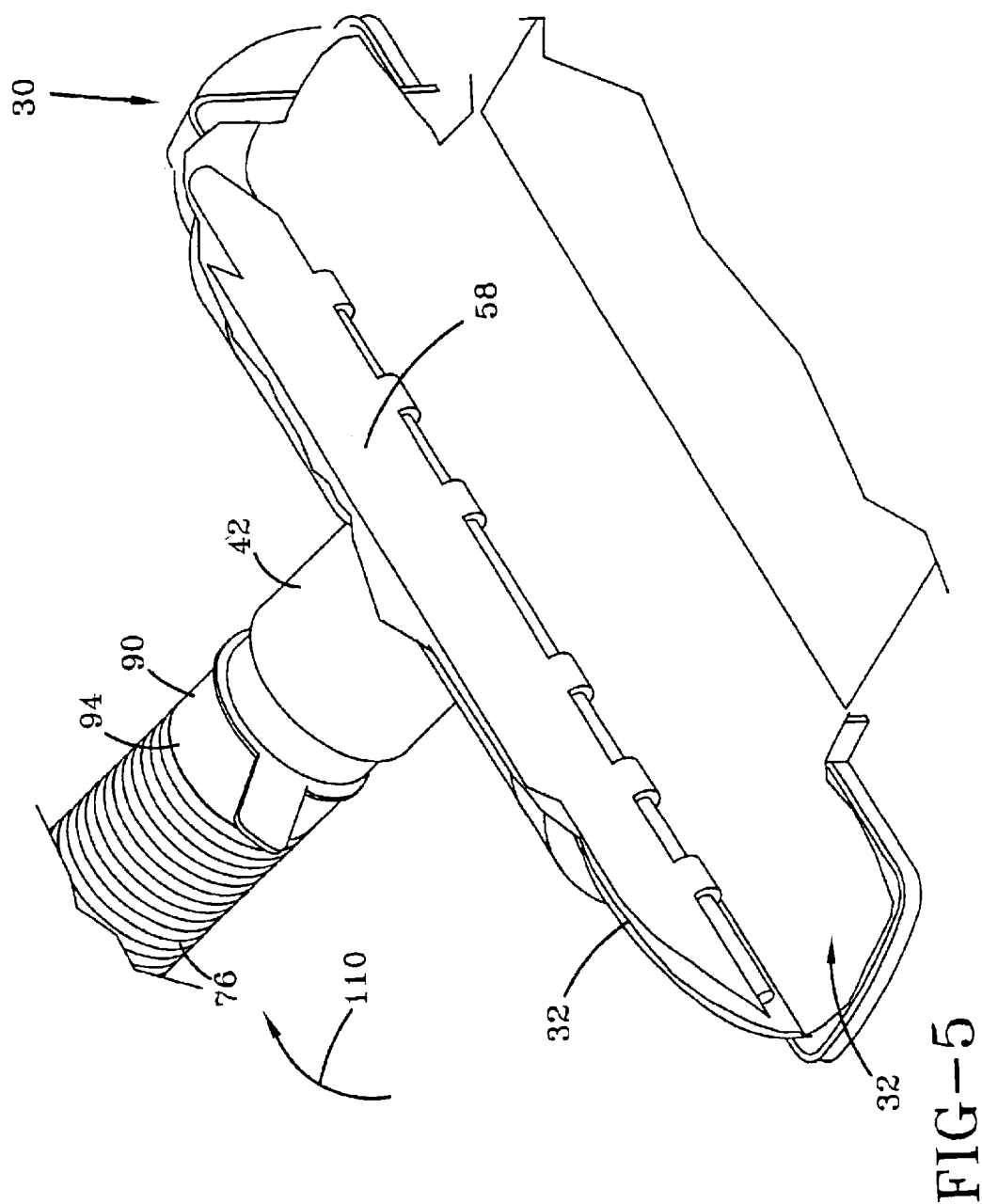
FIG. 5 is a perspective view of the nozzle shown partially in phantom illustrating the flap adjustment member in the second position thereby permitting the flap to cover the second opening and open the first opening.
Figure 6:
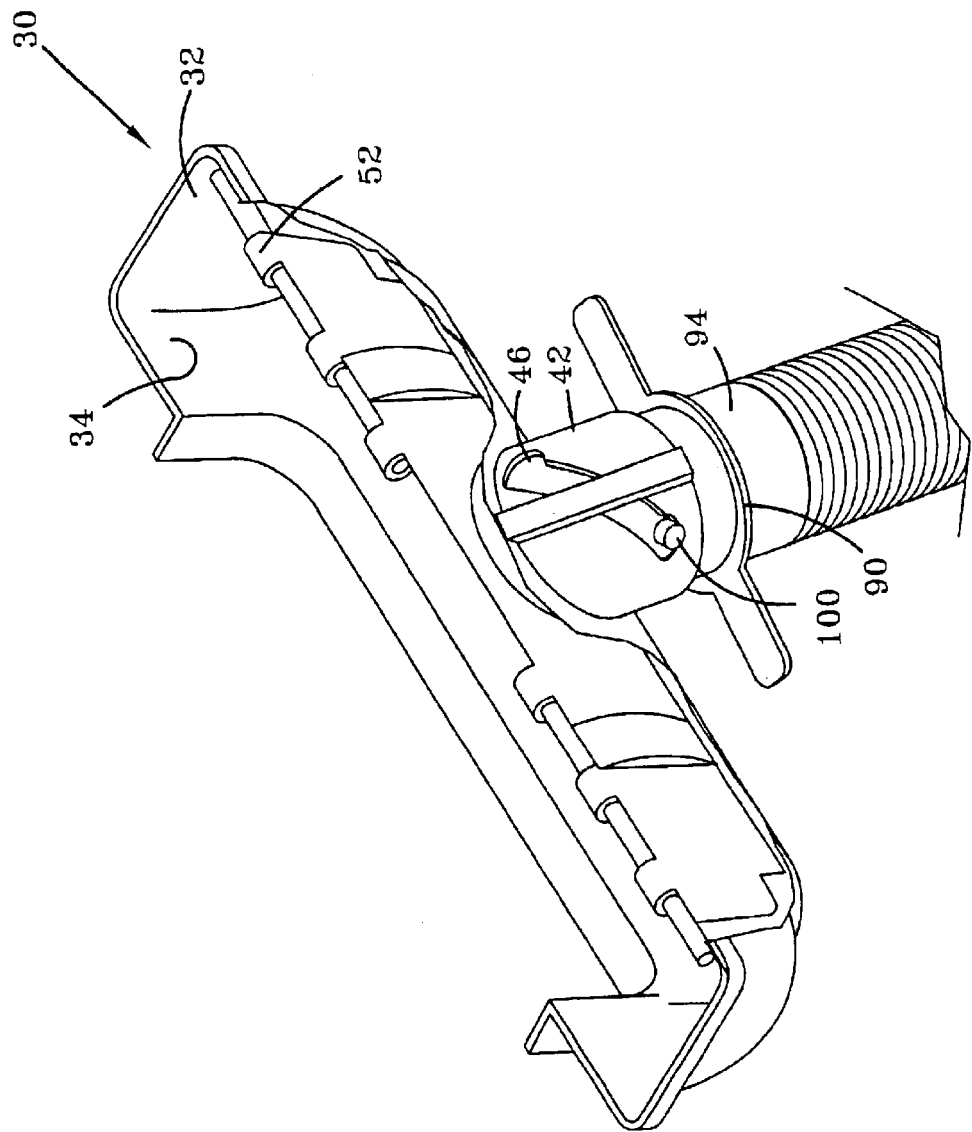
FIG. 6 is a bottom view of the nozzle shown in FIG. 5.

With reference now to FIGS. 1–8b, a flap adjustment member 90 having first and second ends 92, 94 can be adjusted with respect to the nozzle body 32 into first and second positions. When the flap adjustment member 90 is adjusted into the first position, it causes the flap 50 to cover the first opening 34 and thus to open the second opening 36. This first position is shown in FIGS. 3–4. When the flap adjustment member 90 is adjusted into the second position, it causes the flap 50 to cover the second opening 36 and thus to open the first opening 34. This second position is shown in FIGS. 5–6. The first end 92, as seen best in FIGS. 7a–8b, has a contact surface 96 for use in contacting and thus positioning the flap 50. Although the flap adjustment member 90 may be positioned relative to the nozzle body 32 in any manner chosen with sound engineering judgement, in the preferred embodiment the flap adjustment member 90 is received within the second opening 36 as shown. In this way, the second end 94 of the flap adjustment member 90 can be adapted to receive an implement such as the vacuum hose 76. Preferably, the flap adjustment member 90 is generally cylindrical in shape and fits snuggly but movably within the adjustment extension 42 (and within the second opening 36.) By snuggly fit it is meant that at least a portion of the outer surface of the flap adjustment member 90 contacts at least a portion of the inner surface of the adjustment extension 42 thereby maintaining a substantially airtight connection. By movably fit it is meant that the flap adjustment member 90 can easily be moved relative to the adjustment extension 42 and thus relative to the nozzle body 32.

With reference now to FIGS. 2–7a and 10, the interrelationship of the flap adjustment member 90 and the adjustment extension 42 will now be described. The adjustment extension 42 has a groove 44 therethrough having first and second ends 46, 48 that preferably have first and second notches 47, 49 respectively. As shown best in FIG. 10, the longitudinal centerline of the groove 44 is neither parallel nor perpendicular to the axis of the adjustment extension 42. This alignment of the groove 44 permits the flap adjustment member 90 to move both rotationally and longitudinally with respect to the nozzle body 32. In other words, the flap adjustment member 90 "screws" into and out of the adjustment extension 42 as it is rotated (compare FIGS. 3–4 with FIGS. 5–6). The circumferential length of the groove 44 that is perpendicular to the axis of the flap adjustment member 90 determines (limits) the degree of rotation that the flap adjustment member 90 may be rotated. The flap adjustment member 90 may be rotated an angle A (shown in FIG. 7a) that in the preferred embodiment is about 90° between the first and second positions. This 90° rotation preferably extends (and recedes) the first end 92 of the flap adjustment member 90 about 1.0 inch into (and out of) the nozzle body 32. The adjustment extension 42 has a channel 43 (see FIG. 10) formed on the outside surface that is generally parallel to the adjustment extension axis and that intersects the groove 44 as shown. The flap adjustment member 90 has a pin 100 extending from its outer surface. When the flap adjustment member 90 is attached to the adjustment extension 42, the pin 100 is received in the channel 43 and then within the groove 44. The flap adjustment member 90 also has at least one hand grip 98 (preferably two on opposite sides) for use by the operator in adjusting the flap adjustment member 90 and thus positioning the flap 50.

Figures 7A, 7B:
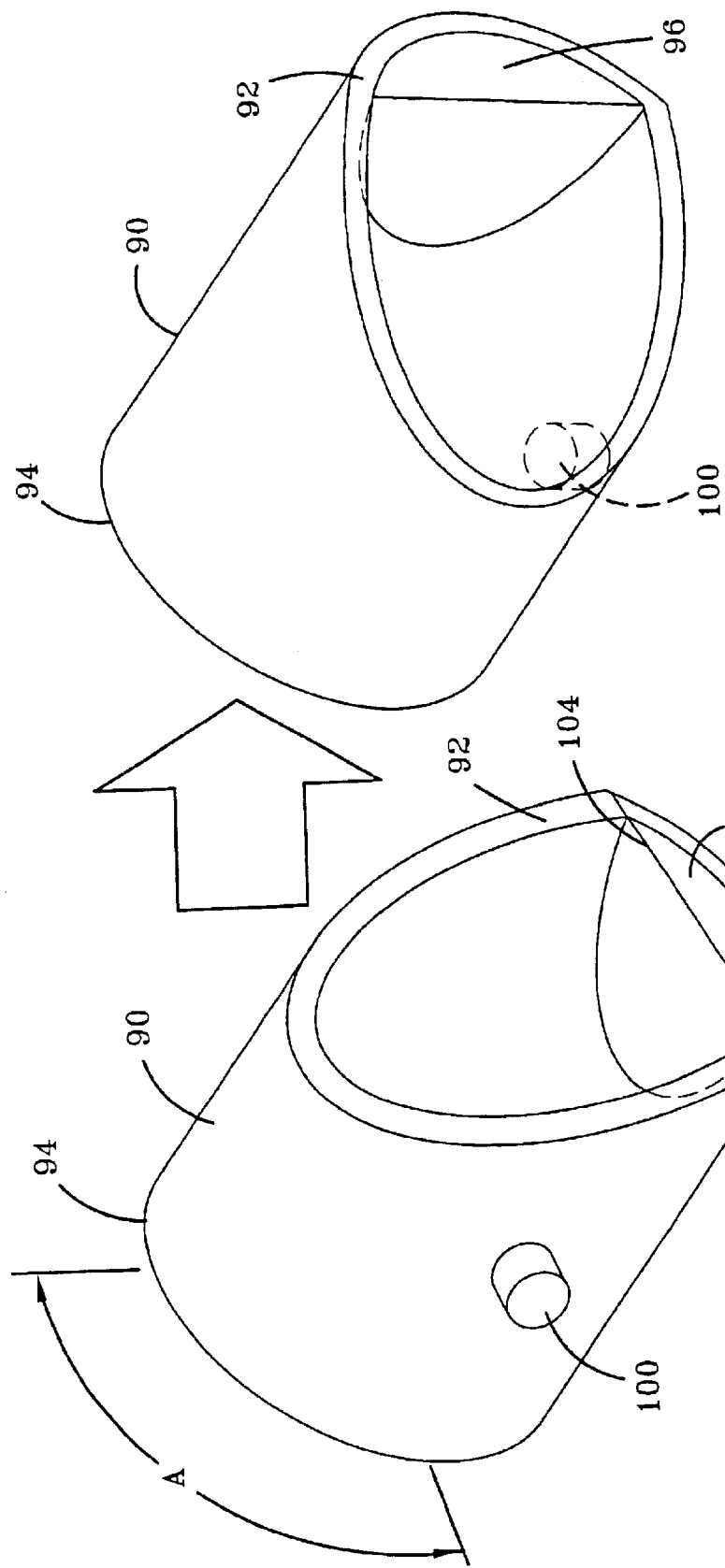
FIG. 7a is a schematic representation of the flap adjustment member in the first position showing the contact surface.
FIG. 7b is similar to FIG. 7a except that the flap adjustment member is shown rotated into the second position.
Figure 9:
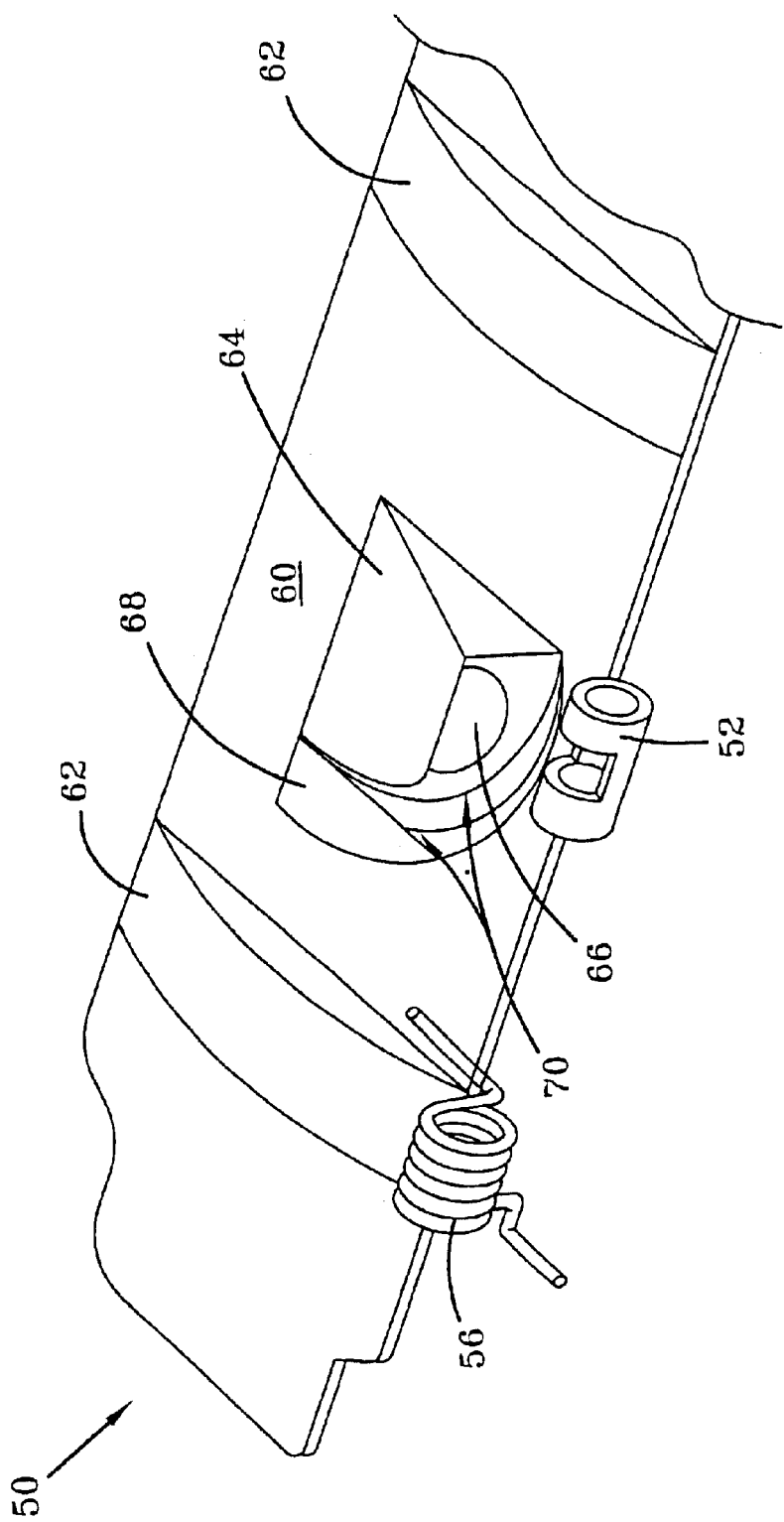
FIG. 9 is a perspective view of the flap showing the contact zone having fist and second patch areas.
Figure 10:
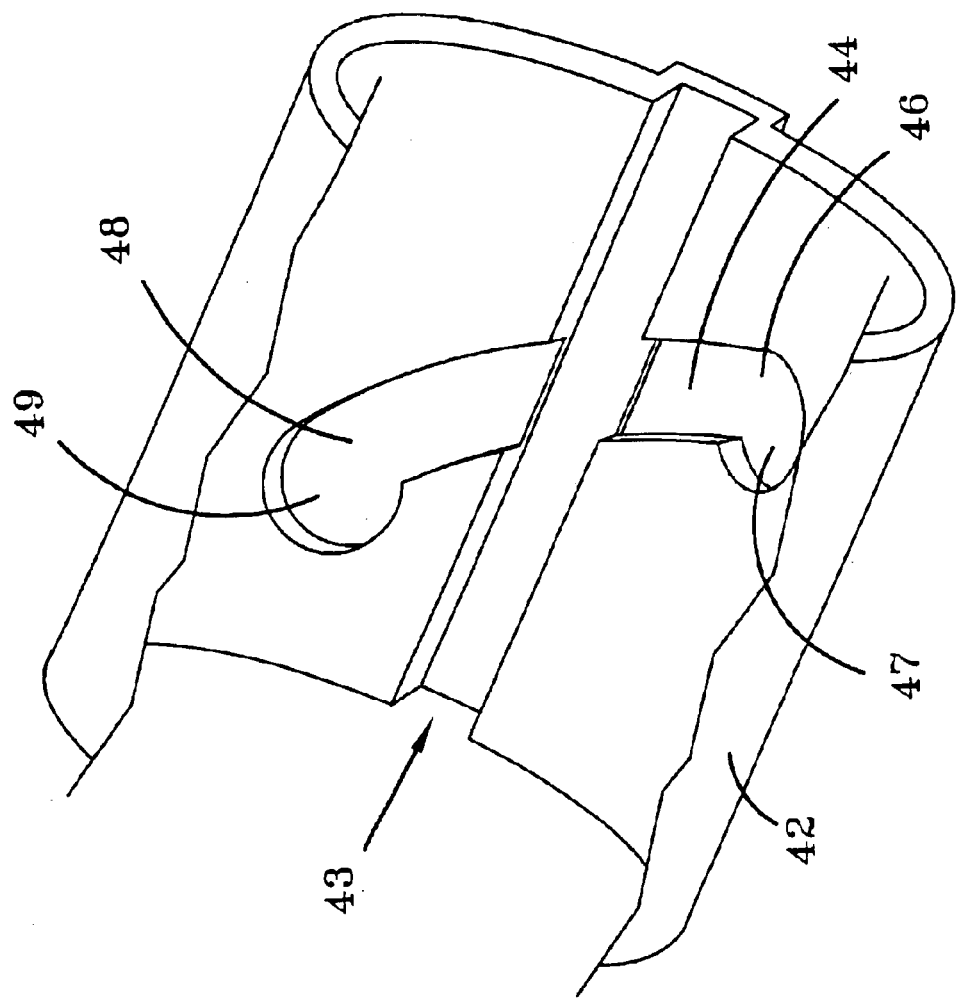
FIG. 10 is a partial perspective view of the adjustment extension showing the channel and the groove.
Figure 11:
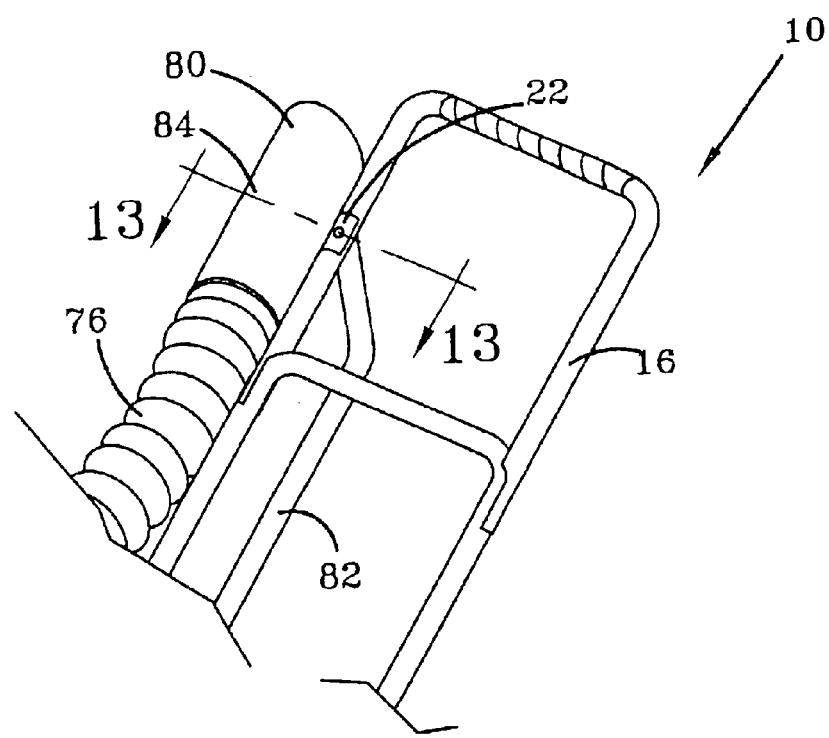
FIG. 11 is a partial perspective view of the vacuum unit showing the hose handle attached to the vacuum unit handle.
Figure 12:
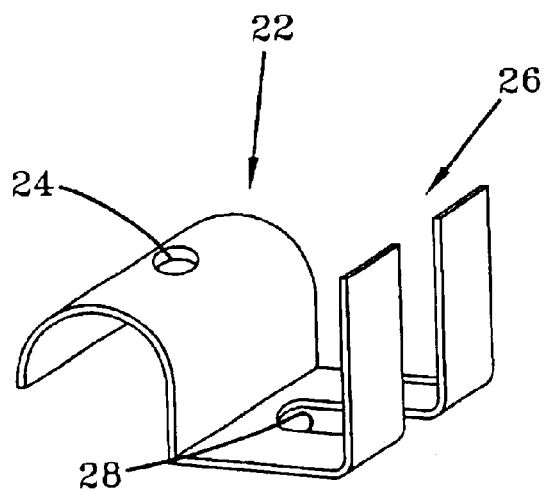
FIG. 12 is a perspective view of the attachment bracket showing the reception portion.
Figure 13:
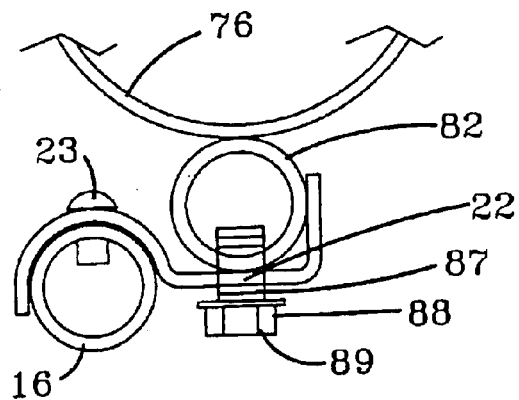
FIG. 13 is a sectional view taken through the line 13—13 of FIG. 11 showing the extending member positioned within the slot in the attachment bracket.
Figure 14A:
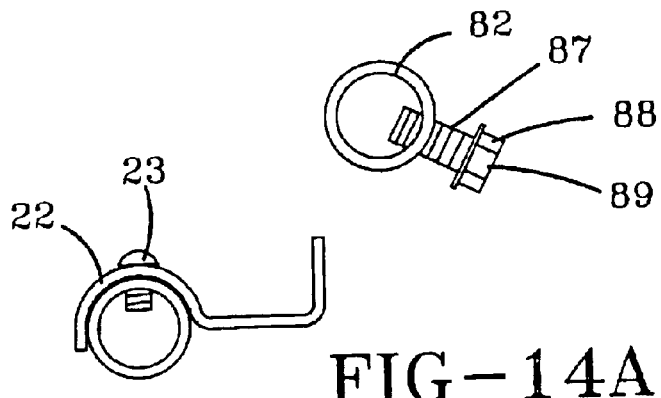
FIG. 14a is a sectional schematic view of a first in series condition showing how the hose handle with the extending member is positioned within the attachment bracket.
Figure 14B:
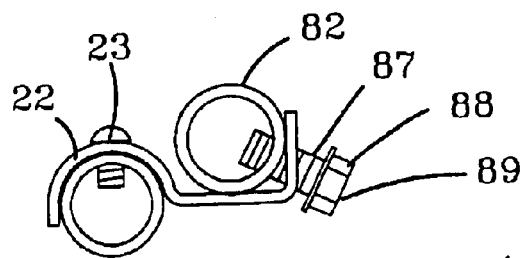
FIG. 14b is a sectional schematic view of a second in series condition showing how the hose handle with the extending member is positioned within the attachment bracket.
Figure 14C:
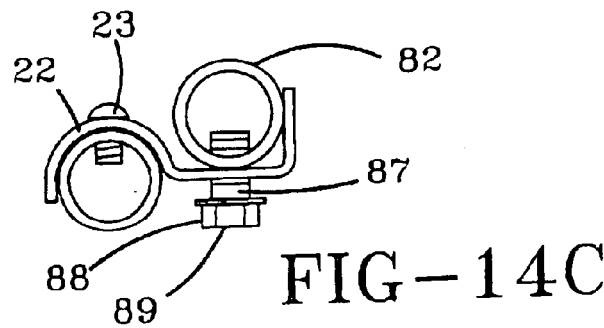
FIG. 14c is a sectional schematic view of a third in series condition showing how the hose handle with the extending member is positioned within the attachment bracket.
Figure 15:
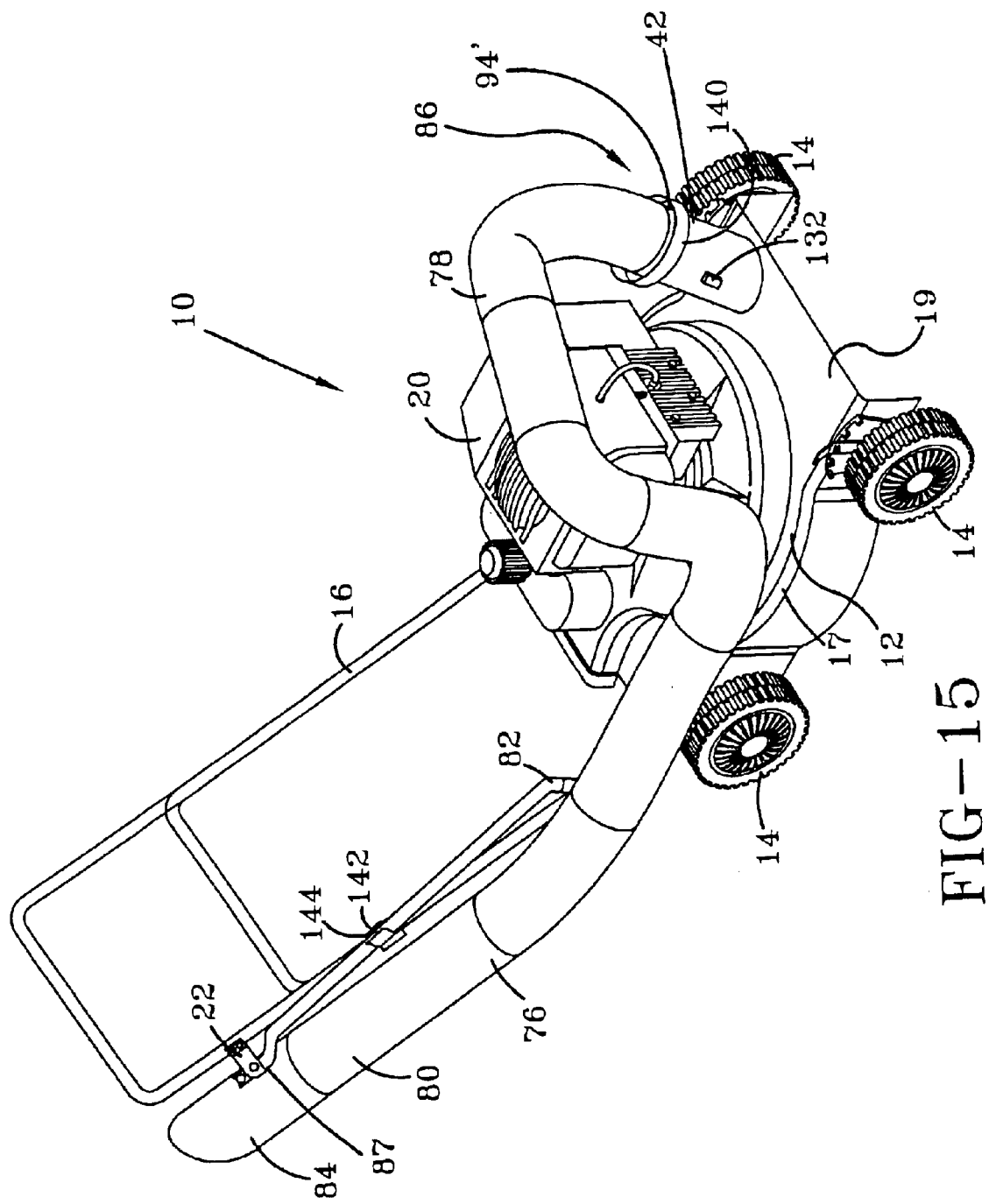
FIG. 15 is a perspective front view of a vacuum unit showing the second embodiment of this invention with the nozzle removed.
Figure 16:
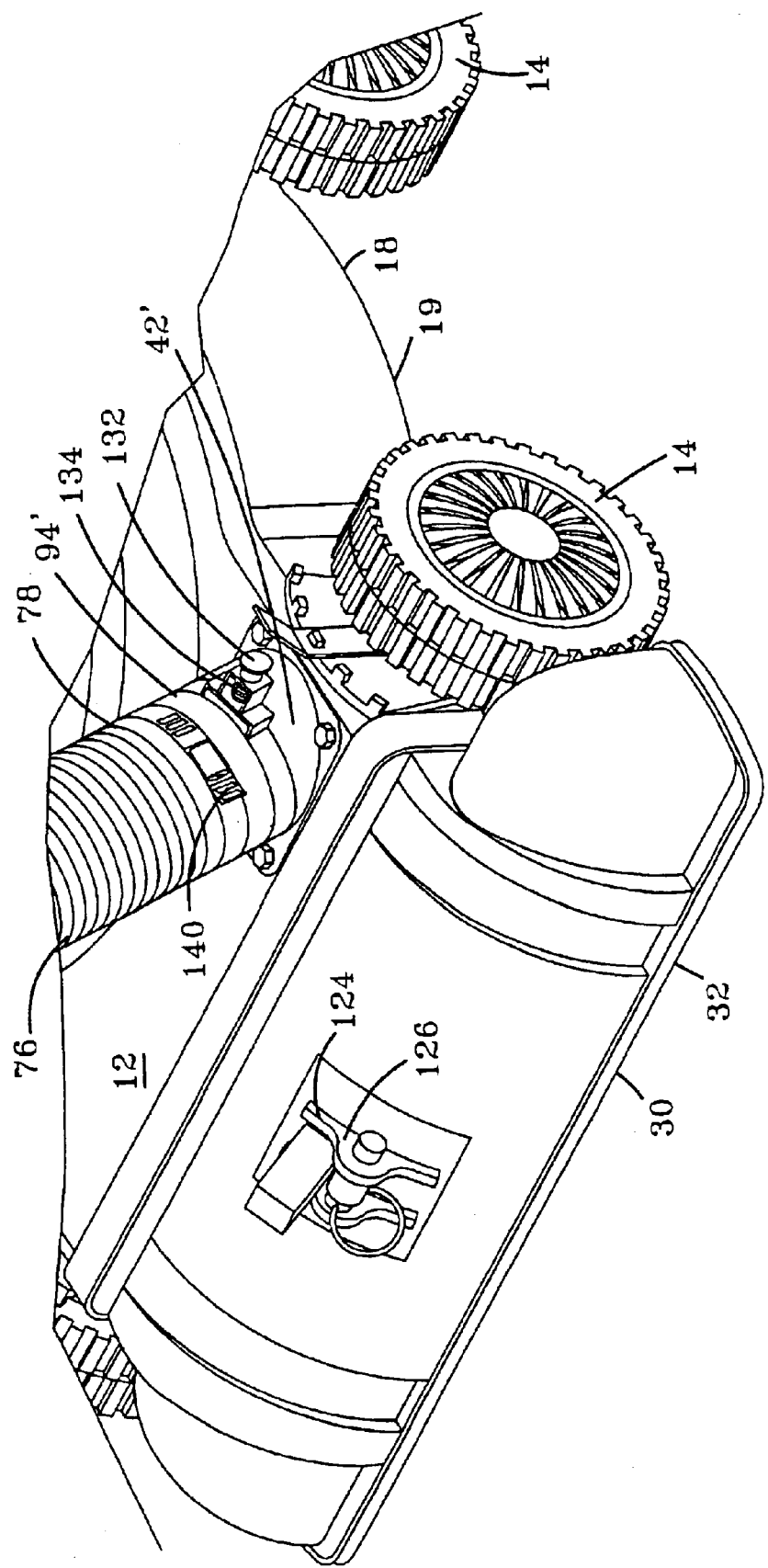
FIG. 16 is a perspective front view of a vacuum unit showing the flap adjustment member positioned within the adjustment extension.

With reference now to FIGS. 7a–9, the interrelationship of the flap adjustment member 90 and the flap 50 will now be described. Adjacent to the contact surface 96, the first end 92 of the flap adjustment member 90 is angled at an angle B with respect to the flap adjustment member 90 axis as seen best in FIG. 8a. This angled design maximizes the available cross sectional area available to transport debris through the flap adjustment member 90 and softens the change in angle that the debris must encounter as the debris exits the flap adjustment member 90 and enters the nozzle body 32. The resultant debris flow path is shown in FIG. 8a with reference number 102. Preferably the contact surface 96, as shown in FIG. 7a, is generally planar with a straight side 104 and a curved side 106 although any shape chosen with sound engineering judgement may be used. The contact zone 64 on the flap 50 is preferably a projection from the surface of the first side 58. The contact zone 64 includes a generally planar first patch area 66, a generally planar second patch area 68 and a sliding surface 70 between the patch areas 66, 68. Preferably the first and second patch areas 66, 68 are substantially the same size and shape as the contact surface 96. The contact surface 96 of the flap adjustment member 90 contacts the first patch area 66 when the flap adjustment member 90 is placed into its first position (shown in FIGS. 7a and 8a) thereby causing the flap 50 to cover the first opening 34. Preferably the first patch area 66 is substantially perpendicular to the axis of the flap adjustment member 90 (shown in FIG. 8) when the contact surface 96 is contacting the first patch area 66. The contact surface 96 of the flap adjustment member 90 contacts the second patch area 68 when the flap adjustment member 90 is placed into its second position (shown in FIGS. 7b and 8b) thereby permitting the flap 50 to cover the second opening 36. The contact surface 96 contacts and slides along the sliding surface 70 as the flap adjustment member 90 is adjusted between the first and second positions.

With reference now to FIGS. 3–9, to adjust the flap adjustment member 90 into the first position, the operator uses the hand grips 98 to rotate the flap adjustment member 90 in a first direction 108 (shown in FIG. 3) with respect to the nozzle body 32. This causes the pin 100 to slide within the groove 44 to a first location that is preferably the first end 46 and more preferably into the first notch 47. The first notch 47 holds the pin 100 and thus the flap adjustment member 90 in the first position. As the flap adjustment member 90 is being adjusted into the first position, the contact surface 96 slides along the sliding surface 70 of the flap 50 into the first patch area 66. Because the flap adjustment member 90 extends into the nozzle body 32 as it rotates in the first direction 108, the contact surface 96 now holds the flap 50 over the first opening 34. This opens the second opening 36 permitting debris to be vacuumed into the nozzle 30 and on into the vacuum unit 10. To adjust the flap adjustment member 90 into the second position, the operator uses the hand grips 98 to rotate the flap adjustment member 90 in a second direction 110 (shown in FIG. 5) with respect to the nozzle body 32. This causes the pin 100 to slide within the groove 44 to a second location that is preferably the second end 48 and more preferably into the second notch 49. The second notch 49 holds the pin 100 and thus the flap adjustment member 90 in the second position. As the flap adjustment member 90 is being adjusted into the second position, the contact surface 96 slides along the sliding surface 70 of the flap 50 into the second patch area 68. Because the flap adjustment member 90 recedes from the nozzle body 32 as it rotates in the second direction 110, the spring 56 now causes the flap 50 to cover the second opening 36. This opens the first opening 34 permitting debris to be vacuumed into the nozzle 30 and on into the vacuum unit 10.

Figure 18:
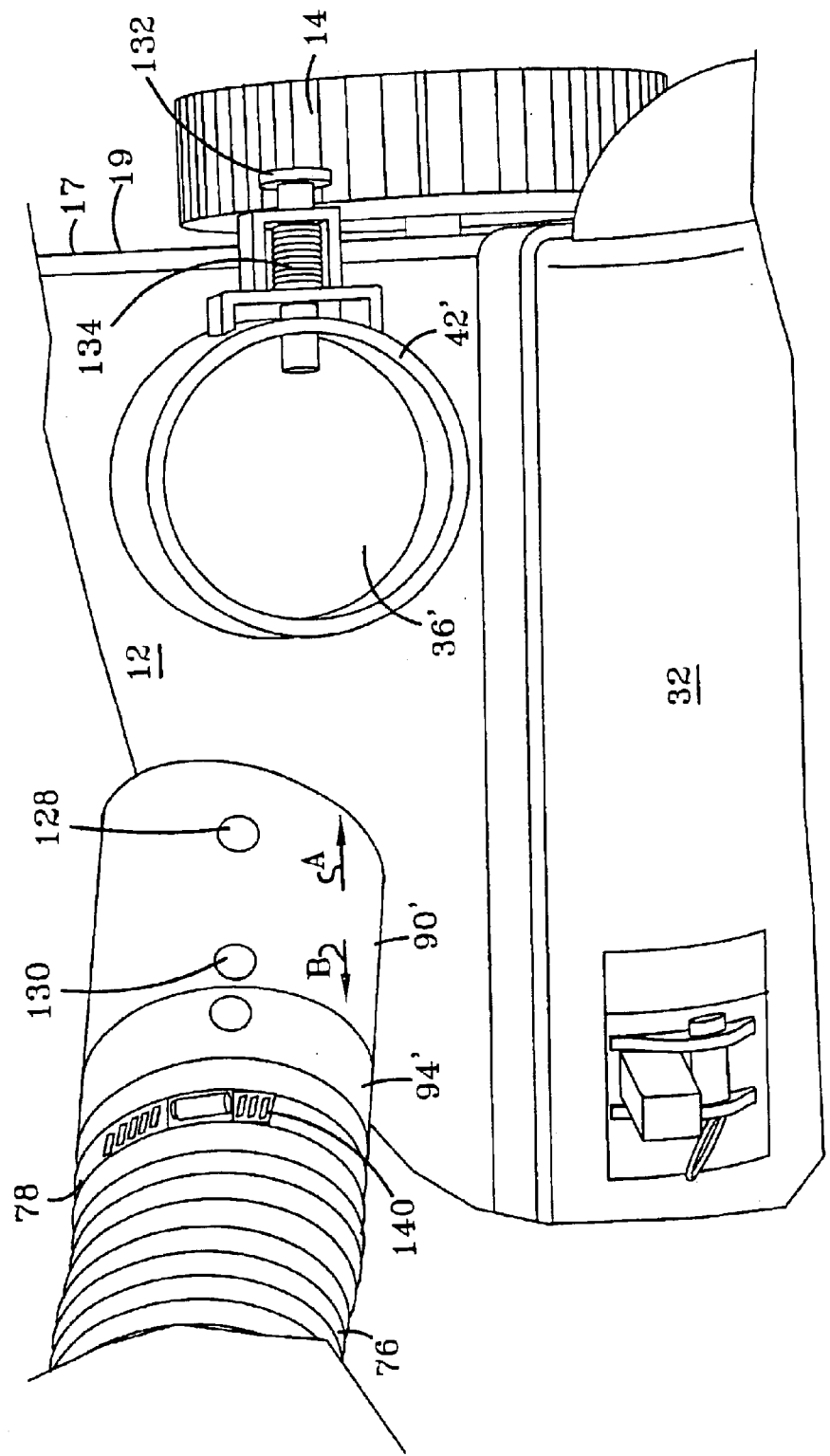
FIG. 18 is a side perspective view showing how the flap adjustment member is positioned within the adjustment extension.
Figure 20:
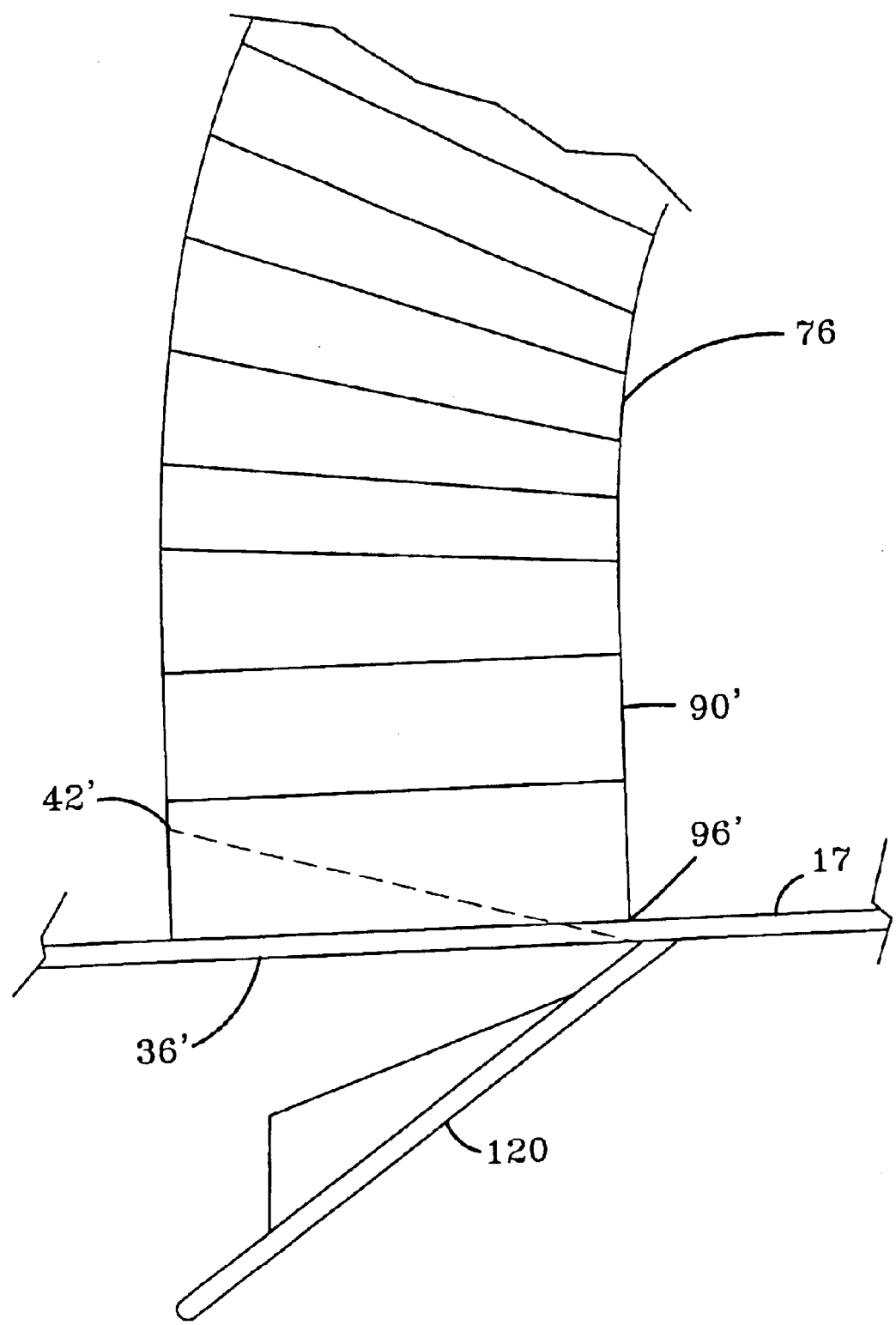
FIG. 20 is a schematic representation of the flap adjustment member in the first position.
Figure 22:
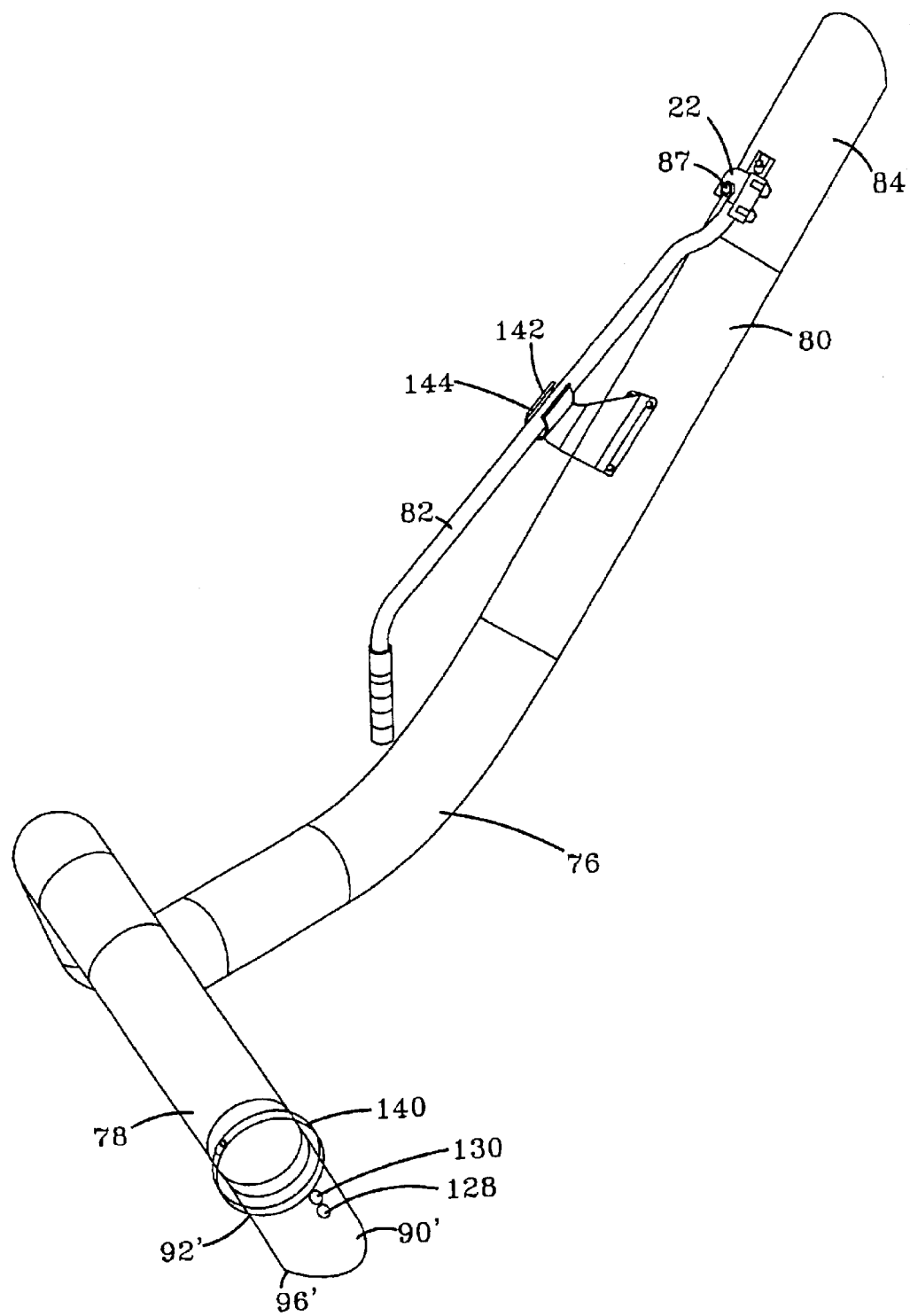
FIG. 22 is a perspective view of the hose including the hose handle.

With reference now to FIGS. 1 and 11–14c, the hose 76 is preferably flexible and has a first end 78 that is adapted to be attached to a hose attachment member 86 such as the second end 94 of the flap adjustment member 90 by any means chosen with sound engineering judgement such as with a hose clamp 140 (as shown best in FIGS. 18 and 22 which illustrate a second preferred embodiment of this invention). The hose 76 also has a second end 80 that is adapted to be used in vacuuming associated debris. Preferably a hose head 84 is attached to the second end 80 to provide rigidity to assist in vacuuming. The hose 76 also includes a hose handle 82 for use by the operator in holding the hose 76 during vacuuming operation. Preferably the hose handle 82 is also adapted to be attached to the vacuum unit handle 16. This permits the first opening 34 of the nozzle 30 to be used for vacuuming while maintaining the hose 76 in an attached condition above the ground. To accomplish this, it is only necessary to rotate the flap adjustment member 90, as discussed above, and then attach the hose handle 82 onto the vacuum unit handle 16. Alternatively, to adjust the nozzle 30 such that the hose 76 may be used for vacuuming, it is only necessary for the operator to rotate the flap adjustment member 90 in the opposite direction and then de-attach the hose handle 82 from the vacuum unit handle 16.

Figure 23:
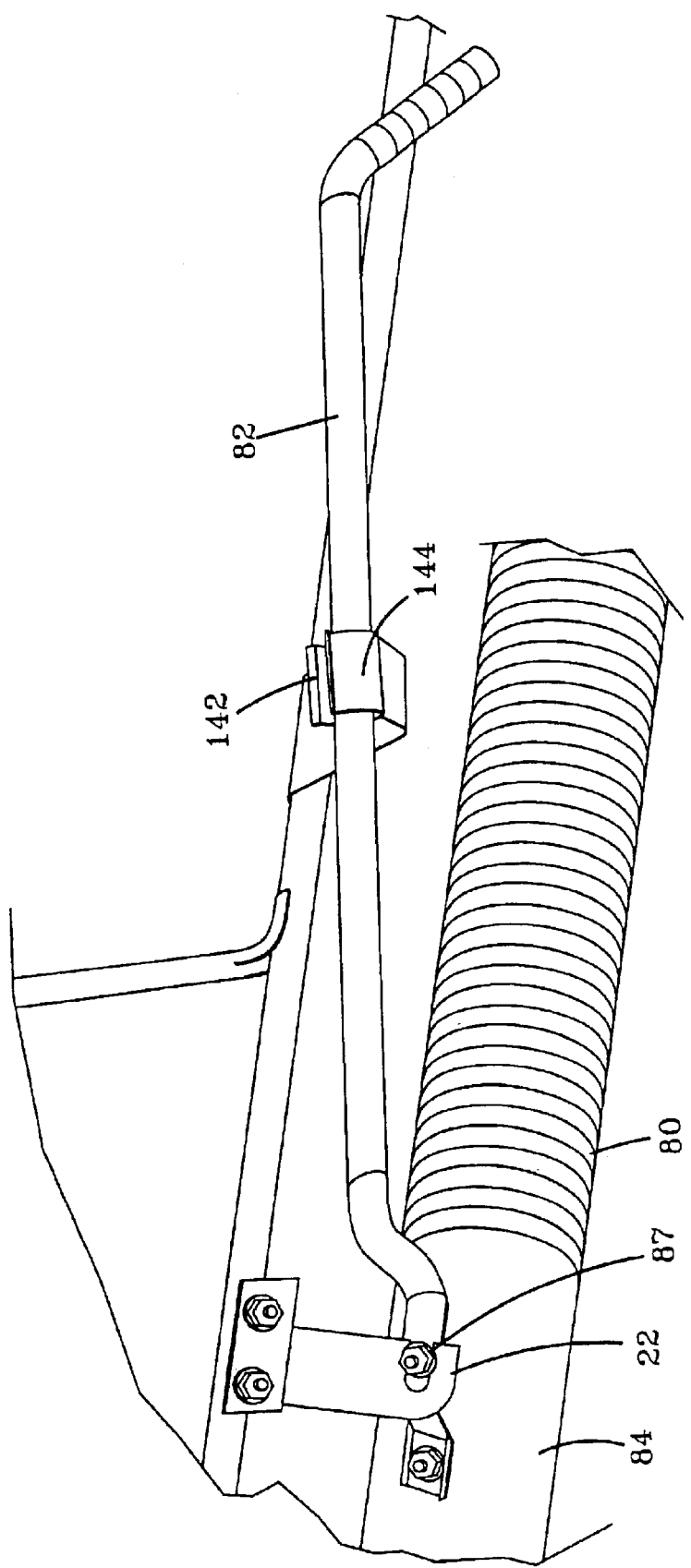
FIG. 23 is a perspective view showing the hose handle positioned within the attachment bracket and the attachment clip.
Figure 24A:
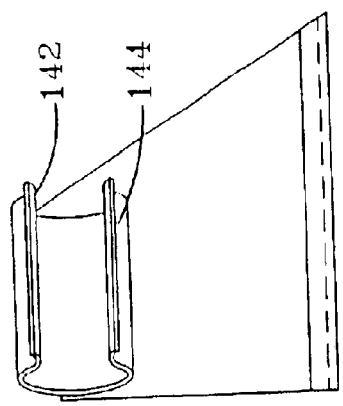
FIG. 24a is a top view of the attachment clip of FIG. 24b.
Figure 24C:
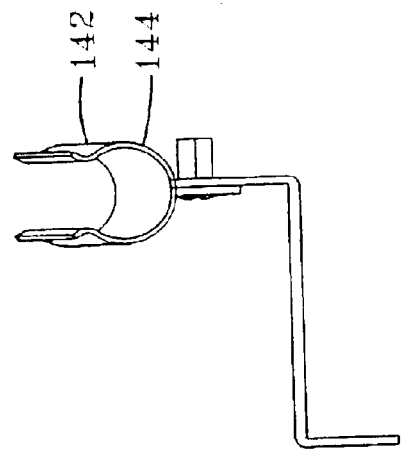
FIG. 24c is a front view of the attachment clip of FIG. 24b.
Figure 24B:
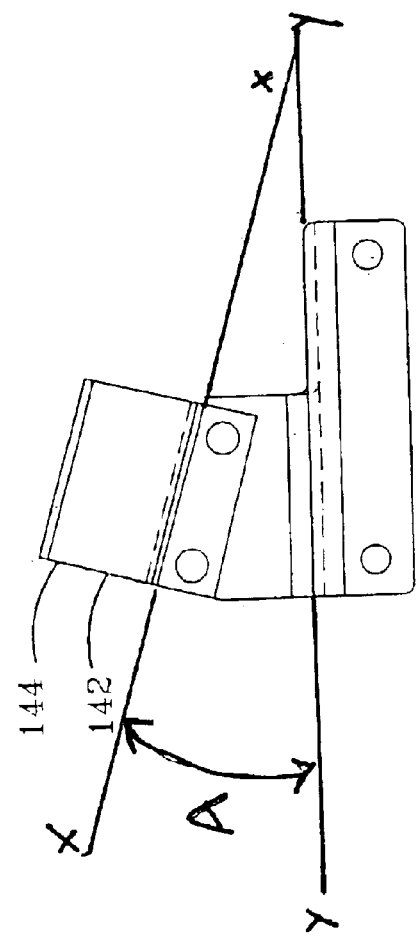
FIG. 24b is a side view of the attachment clip.

With continuing reference to FIGS. 1 and 11–14c, the method used to attach the hose handle 82 to the vacuum unit handle 16 can be any method chosen with sound engineering judgment. An attachment bracket 22 may be operatively connected to the vacuum unit handle 16 such as by using a screw 23 through a screw hole 24 in the attachment bracket 22. The attachment bracket 22 has a reception portion 26 that receives the hose handle 82 and thereby holds the hose 76 to the vacuum unit 10. The reception portion 26 may be of any type chosen with sound engineering judgment. In the preferred embodiment, however, the reception portion 26 is generally L-shaped and includes a slot 28 as shown. The hose handle 82 preferably has an extending member 88 such as a bolt 87. To attach the hose handle 82 to the attachment bracket 22 the operator simply places the extending member 88 within the slot 28 in the reception portion 26 as shown in progressive manner in FIGS. 14a–14c. Most preferably the extending member 88 has a tip 89 larger in width than the rest of the extending member 88 and larger in width than the slot 28. In this way the tip 89 in combination with the L-shaped reception portion 26 will maintain the hose 76 to the vacuum unit 10. The hose 76 can be removed from the vacuum Unit handle 16 to vacuum, for example, by simply removing the extending member 88 from the slot 28. The vacuum unit handle 16 may also include a second attachment means 144, such as an attachment clip 142 (as shown best in FIGS. 23–24c which illustrate a second preferred embodiment of this invention) to provide additional support to the hose handle 82. The clip portion 142 has a longitudinal axis X—X and the attachment portion has a longitudinal axis Y—Y. Angle A is the angle between these two axes and may be an angle from 0 degrees to 80 degrees. The attachment clip 142 may be attached to the vacuum unit handle 16 by any method chosen with sound engineering judgment, such as screws (not shown) or bolts (not shown).

The above-described first embodiment of this invention provides a very effective and inexpensive means for using a single flap 50 to selectively cover the first and second openings 34, 36 of the vacuum unit 10. However, it is also within the terms of this invention to provide a second embodiment, as illustrated in FIGS. 15–20, wherein two separate and independent flaps 120, 122 are used to selectively cover the first and second openings 34', 36' of the vacuum unit 10.

Figure 17:
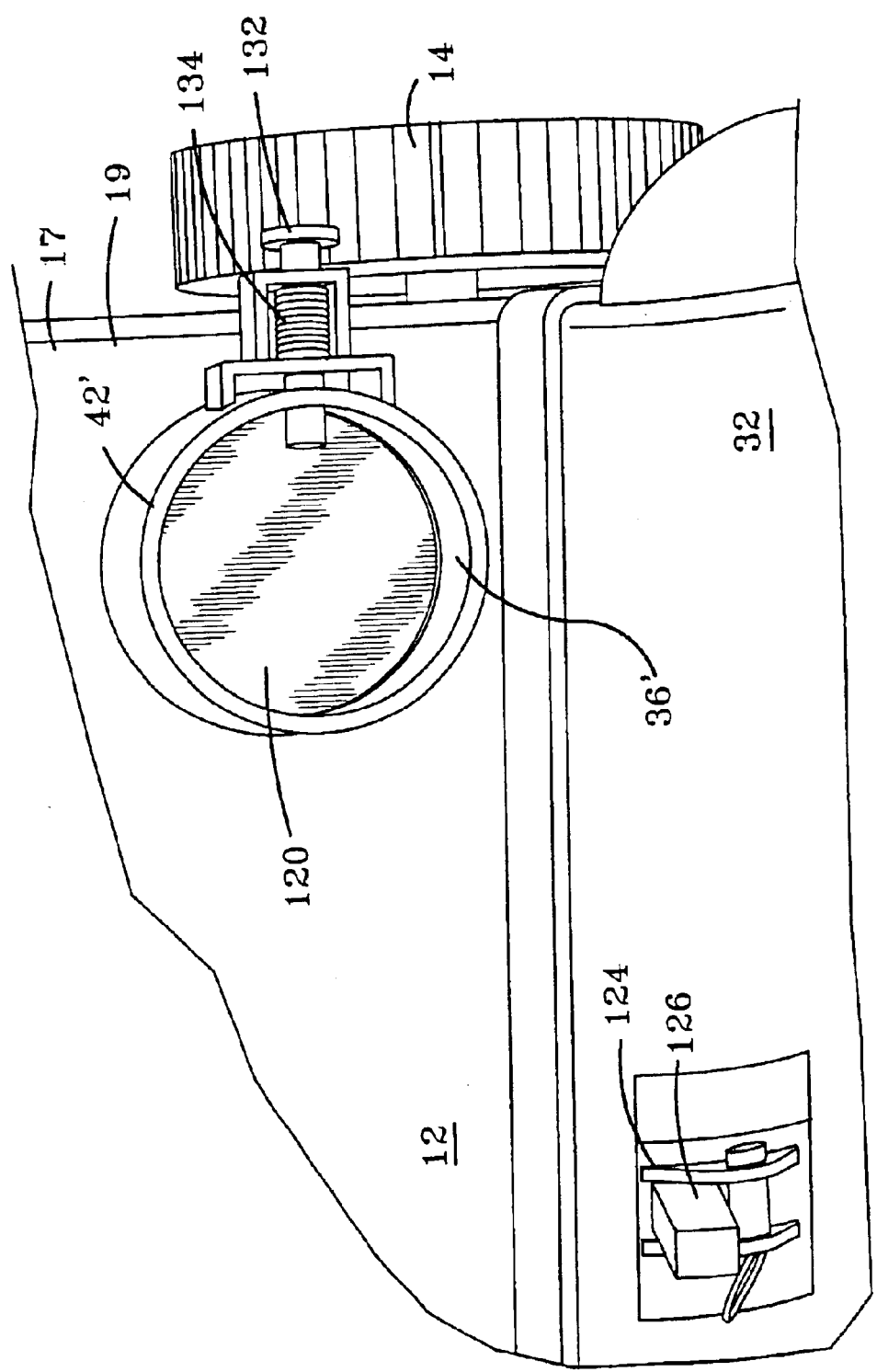
FIG. 17 is a top perspective view showing the adjustment extension positioned within the second opening.

With reference now to FIGS. 17 and 18, in the second embodiment of this invention, the second opening 36' of the vacuum unit 10 is located on the vacuum deck 17, not on the nozzle 30. Preferably the vacuum deck 17 has a vacuum deck body 19 that includes the second opening 36'. The vacuum deck 17 also has a first flap 120 (shown best in FIG. 20) that is used to cover (close) the second opening 36' when the second opening 36' is not being used to vacuum debris. The first flap 120 is pivotally attached to the vacuum deck body 19 using a plurality of pivot rod receivers (not shown) that receive a pivot rod (not shown) that is attached to the vacuum deck body 19 by any means chosen with sound engineering judgment. Biasing means, similar to that used in the first embodiment of this invention and incorporated herein, may be used to bias the first flap 120 to cover the second opening 36'.

With reference now to FIGS. 15, 16 and 18–20, a flap adjustment member 90' for use in association with the first flap 120 is shown. The flap adjustment member 90' has first and second ends 92', 94' that can be adjusted with respect to the vacuum deck body 19 into first and second positions. When the flap adjustment member 90' is adjusted into the first position, it causes the first flap 120 to open the second opening 36'. Conversely, when the flap adjustment member 90' is adjusted into the second position, it permits the first flap 120 to cover the second opening 36'. The first end 92' (as shown best in FIGS. 18, 19a, 19c and 20) has a contact surface 96' for use in contacting and, thus, positioning the first flap 120. Although the flap adjustment member 90' may be positioned relative to the vacuum deck body 19 in any manner chosen with sound engineering judgment, in the preferred embodiment, the flap adjustment member 90' is received within the second opening 36' as shown in FIG. 18. And, more specifically, the flap adjustment member 90' is received within the adjustment extension 42' that extends from the vacuum deck body 19. In this way, the second end 94' of the flap adjustment member 90' can be adapted to receive an implement such as the vacuum hose 76. Preferably the flap adjustment member 90' is generally cylindrical in shape and fits snuggly but movably within the adjustment extension 42', as described in the first embodiment of this invention and incorporated herein.

With reference now to FIGS. 15–18, the interrelationship of the flap adjustment member 90' to the adjustment extension 42' and the first flap 120 will now be described. The adjustment extension 42' has an adjustment pin 132 that is slidably connected to the adjustment extension 42' and extends therethrough (as show in FIG. 17). Preferably the adjustment pin 132 is biased (most preferably using a spring 134 as shown in FIGS. 17 and 18) to extend through the adjustment extension 42' and into either a first or second hole 128, 130 located on the flap adjustment member 90'. The first and second holes 128, 130 permit the flap adjustment member 90' to be adjusted with respect to the adjustment extension 42' into first and second positions. In the second position, the first flap 120 covers the second opening 36'. Conversely, in the first position, the first flap 120 is moved away thereby uncovering (opening) the second opening 36'. The flap adjustment member 90' is adjusted into the first position by moving the adjustment member 90' in the downward direction of Arrow A into the second hole 130. The flap adjustment member 90' is adjusted into the second position by moving the adjustment member 90' in the upward direction of Arrow B into the first hole 128. The movement of the flap adjustment member 90' into the first position causes the second end 94' of the flap adjustment member to contact and, thus, position the first flap 120. To keep the flap adjustment member 90' properly aligned with respect to the adjustment extension 42', the flap adjustment member 90' preferably includes a nub 136' that is slidably received within a groove (not shown) that extends on an inner surface of the adjustment extension 42'.

Figure 21:
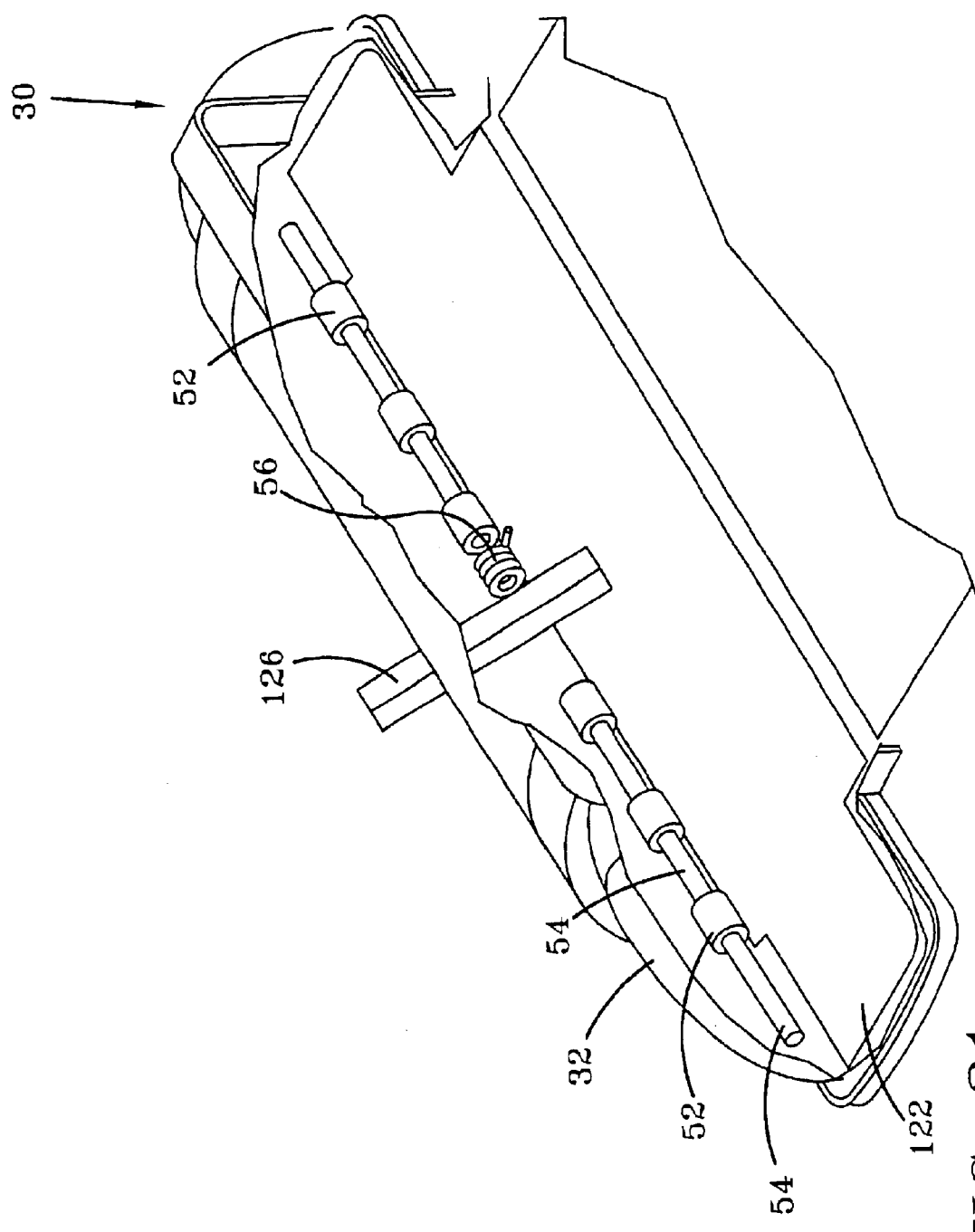
FIG. 21 is a perspective view of the nozzle shown partially in phantom illustrating the flap adjustment means in the first position thereby causing the second flap to cover the first opening.

With reference to FIG. 21, a second flap 122 is used to cover the first opening 34 when the first opening 34 is not being used to vacuum debris. The second flap 122 is pivotally attached to the nozzle body 32 using a plurality of pivot rod receivers 52 that receive a pivot rod 54 that is attached to the nozzle body 32 by any means chosen with sound engineering judgment. A flap adjustment means 124 (shown best in FIGS. 16 and 17) is used to position the second flap 122 into a first position where it covers the first opening 34 and a second position where it uncovers (opens) the first opening 34. In the preferred embodiment, the flap adjustment means 124 is an adjustment handle 126 that extends from the second flap 122 through the nozzle body 32 and is connected to a biasing means, such as a torsion spring 56. Activation of the adjustment handle 126 causes the biasing means to bias the second flap 122 into the second position and uncover the first opening 120.

The invention has been described with reference to two preferred embodiments. Obviously, modifications and alterations will occur to others upon a reading and understanding of this specification. It is intended to include all such modifications and alternations in so far as they come within the scope of the appended claims or the equivalence thereof.

What is claimed is:

1. A vacuum unit comprising:

a vacuum unit body;

a vacuum unit handle that extends from said vacuum unit body;

an attachment bracket operatively connected to said vacuum unit handle, said attachment bracket having a reception portion;

a plurality of ground engaging wheels operatively connected to said vacuum unit body;

an engine operatively supported by said vacuum unit body;

at least a first fan blade positioned within said vacuum unit body and selectively rotated by said engine, said at least first fan blade for use in creating a vacuum pressure within said vacuum unit body;

a hose attachment member operatively connected to said body for use in receiving and transporting associated debris to said body; and, a hose that includes a first end that is adapted to be attached to said hose attachment member, a second end adapted to be used in vacuuming associated debris and a hose handle that is adapted to be selectively attached to said reception portion of said attachment bracket.

2. The vacuum unit of claim 1 further comprising:

wherein said hose handle has an extending member that extends from said hose handle; and, wherein said reception portion of said attachment bracket has a slot adapted to receive said extending member of said hose handle thereby maintaining said hose above the ground.

3. The vacuum unit of claim further comprising:

an attachment means operatively connected to said vacuum unit handle;

said attachment means adapted to support said hose handle on said vacuum unit handle.

4. The vacuum unit of claim 3 wherein said attachment means comprises:

an attachment portion and a clip portion.

5. The vacuum unit of claim 4 wherein said clip portion has a longitudinal axis X—X and the attachment portion has a longitudinal axis Y—Y; wherein angle A is the angle between the two axes.

6. The vacuum unit of claim 2 wherein said extending member comprises a tip secured in said slot.

7. The vacuum unit of claim 1 further comprising:

a hose head operatively connected to said second end of said hose.

8. The vacuum unit of claim 1 wherein said hose is flexible.

9. The vacuum unit of claim 6 further comprising:

an attachment means operatively connected to said vacuum unit handle, said attachment means is adapted to support said hose handle on said vacuum unit handle, said attachment means comprises;

1) an attachment portion and a clip portion;

2) wherein said clip portion has a longitudinal axis X—X and the attachment portion has a longitudinal axis Y—Y; wherein angle A is the angle between the two axes;

a hose head operatively connected to said second end of said hose; and, wherein said hose is flexible.

10. A method of attaching a hose handle to a vacuum unit, the method comprising the steps of:

providing a vacuum unit body, a vacuum unit handle that extends from said vacuum unit body, an attachment bracket operatively connected to said vacuum unit handle, said attachment bracket having a reception portion, a plurality of ground engaging wheels operatively connected to said vacuum unit body, an engine operatively supported by said vacuum unit body, and at least a first fan blade positioned within said vacuum unit body and selectively rotated by said engine, said at least first fan blade for use in creating a vacuum pressure within said vacuum unit body, and a hose attachment member operatively connected to said body for use in receiving and transporting associated debris to said body;

providing a hose that includes a first end that is adapted to be attached to said hose attachment member, a second end adapted to be used in vacuuming associated debris, and a hose handle that is adapted to be selectively attached to said reception portion of said attachment bracket, said hose handle having an extending member that extends from said hose handle and wherein said reception portion of said attachment bracket having a slot adapted to receive said extending member of said hose handle;

attaching said first end of said hose to said hose attachment member; and, inserting said hose handle into said reception portion of said attachment bracket;

rotating said hose handle;

engaging said extending member in said slot of said reception portion; and, maintaining said extending member in said slot of said reception portion.

11. The method of claim 10 further comprising the steps of:

providing an attachment means operatively connected to said vacuum unit handle, said attachment means adapted to provide additional support to said hose handle;

inserting said hose handle into said attachment means; and maintaining said hose above the ground.

12. The method of claim 11 further comprising the steps of:

providing a nozzle operatively connected to said second end of said hose comprising:
1) a nozzle body having first and second openings;
2) a flap operatively connected to said nozzle body, said flap selectively covering said first and second openings;
3) a flap adjustment member having a contact surface that selectively contacts said flap, said flap adjustment member being selectively adjustable with respect to said nozzle body into first and second positions, said flap covering said first opening when said flap adjustment member is in said first position and covering said second opening when said flap adjustment member is in said second position; and, rotating said flap adjustment member to said first position.

13. A method of storing a vacuum unit hose comprising the steps of:

providing a vacuum unit body, a vacuum unit handle that extends from said vacuum unit body, an attachment bracket operatively connected to said vacuum unit handle, said attachment bracket having a reception portion, a plurality of ground engaging wheels operatively connected to said vacuum unit body, an engine operatively supported by said vacuum unit body, at least a first fan blade positioned within said vacuum unit body and selectively rotated by said engine, said at least first fan blade for use in creating a vacuum pressure within said vacuum unit body, and a hose attachment member operatively connected to said body for use in receiving and transporting associated debris to said body;

providing a hose that includes a first end that is adapted to be attached to said hose attachment member, a second end adapted to be used in vacuuming associated debris and, a hose handle that is adapted to be selectively attached to said reception portion of said attachment bracket, said hose handle having an extending member that extends from said hose handle and wherein said reception portion of said attachment bracket has a slot adapted to receive said extending member of said hose handle thereby maintaining said hose above the ground;

inserting said extending member on said reception portion;

rotating said hose handle; and, engaging said extending member in said slot of said reception portion.

14. The method of claim 13 further comprising the steps of:

providing an attachment means operatively connected to said vacuum unit handle, said attachment means adapted to provide additional support to said hose handle; and, inserting said hose handle into said attachment means, said hose remaining with said vacuum unit body for storing purposes.

15. The method of claim 14 further comprising the steps of:

providing a nozzle operatively connected to said second end of said hose comprising:
1) a nozzle body having first and second openings;
2) a flap operatively connected to said nozzle body, said flap selectively covering said first and second openings;
3) a flap adjustment member having a contact surface that selectively contacts said flap, said flap adjustment member being selectively adjustable with respect to said nozzle body into first and second positions, said flap covering said first opening when said flap adjustment member is in said first position and covering said second opening when said flap adjustment member is in said second position; and rotating said flap adjustment member to said first position.

16. The method of claim 15 further comprising:

rotating said flap adjustment member to said second position;

removing said hose handle from said vacuum unit handle; and, vacuuming associated debris through said second end of said hose.

* * * * *

UNITED STATES PATENT AND TRADEMARK OFFICE
CERTIFICATE OF CORRECTION

PATENT NO.    : 6,782,582 B2                                    Page 1 of 1
DATED         : August 31, 2004
INVENTOR(S)   : Firdaus et al.

It is certified that error appears in the above-identified patent and that said Letters Patent is hereby corrected as shown below:

Column 10,
Line 27, between "claim" and "further", insert -- 1 --.

Signed and Sealed this

Twenty-first Day of December, 2004

JON W. DUDAS
*Director of the United States Patent and Trademark Office*